United States Patent [19]
Oono et al.

[11] Patent Number: 5,157,459
[45] Date of Patent: Oct. 20, 1992

[54] WAVE FRONT ABERRATION MEASURING APPARATUS

[75] Inventors: Masahiro Oono; Tsuyoshi Itoh; Katsuki Hayashi; Toshiyuki Kase; Masahiko Sasaki; Hiroshi Yamamoto; Isao Okuda, all of Tokyo, Japan

[73] Assignee: Asahi Kogaku Kogyo Kabushiki Kaisha, Tokyo, Japan

[21] Appl. No.: 574,071

[22] Filed: Aug. 29, 1990

[30] Foreign Application Priority Data

| Aug. 29, 1989 | [JP] | Japan | 1-225625 |
| Aug. 29, 1989 | [JP] | Japan | 1-225626 |
| Aug. 29, 1989 | [JP] | Japan | 1-225629 |
| Aug. 29, 1989 | [JP] | Japan | 1-225630 |
| Oct. 2, 1989 | [JP] | Japan | 1-258119 |

[51] Int. Cl.$^5$ ............................................ G01B 9/02
[52] U.S. Cl. ...................................... 356/359; 356/345
[58] Field of Search .............. 356/359, 360, 345, 349, 356/351, 353

[56] References Cited

U.S. PATENT DOCUMENTS

| 4,355,871 | 10/1982 | Nevyas et al. | 356/376 |
| 4,379,633 | 4/1983 | Bickel et al. | 356/359 |
| 4,553,229 | 11/1985 | Wakamiya . | |
| 4,660,978 | 4/1987 | Wu | 356/359 |

FOREIGN PATENT DOCUMENTS 61-109015 5/1986 Japan .

OTHER PUBLICATIONS

Copy of the English Language abstract for Japanese Patent No. 61-109015.
Copy of the Hitachi Central Research Article 13a-E-5.
Copy of the Matsushita Denki Central Research Institute Article 13p-E-10.
Copy of the Hitachi Central Research Article 13p-E-12.
Copy of the Optical Shop Testings, pp. 165-172.

*Primary Examiner*—Samuel A. Turner
*Assistant Examiner*—Richard Kurtz
*Attorney, Agent, or Firm*—Sandler, Greenblum & Bernstein

[57] ABSTRACT

An apparatus for measuring a wave front aberration including a light beam splitter for dividing a parallel laser light beam incident from a measuring object into two beam fluxes, an image rotator disposed in at least one optical path of the divided beam fluxes for rotating the wave from on the optical axis, an interference device for interfering, after superposing the beam fluxes, whose wave fronts are rotated relatively, an imaging lens for forming the interfered beam into an image, and an observation device for observing the imaged interference fringes.

16 Claims, 19 Drawing Sheets

FIG. I

F I G. 13
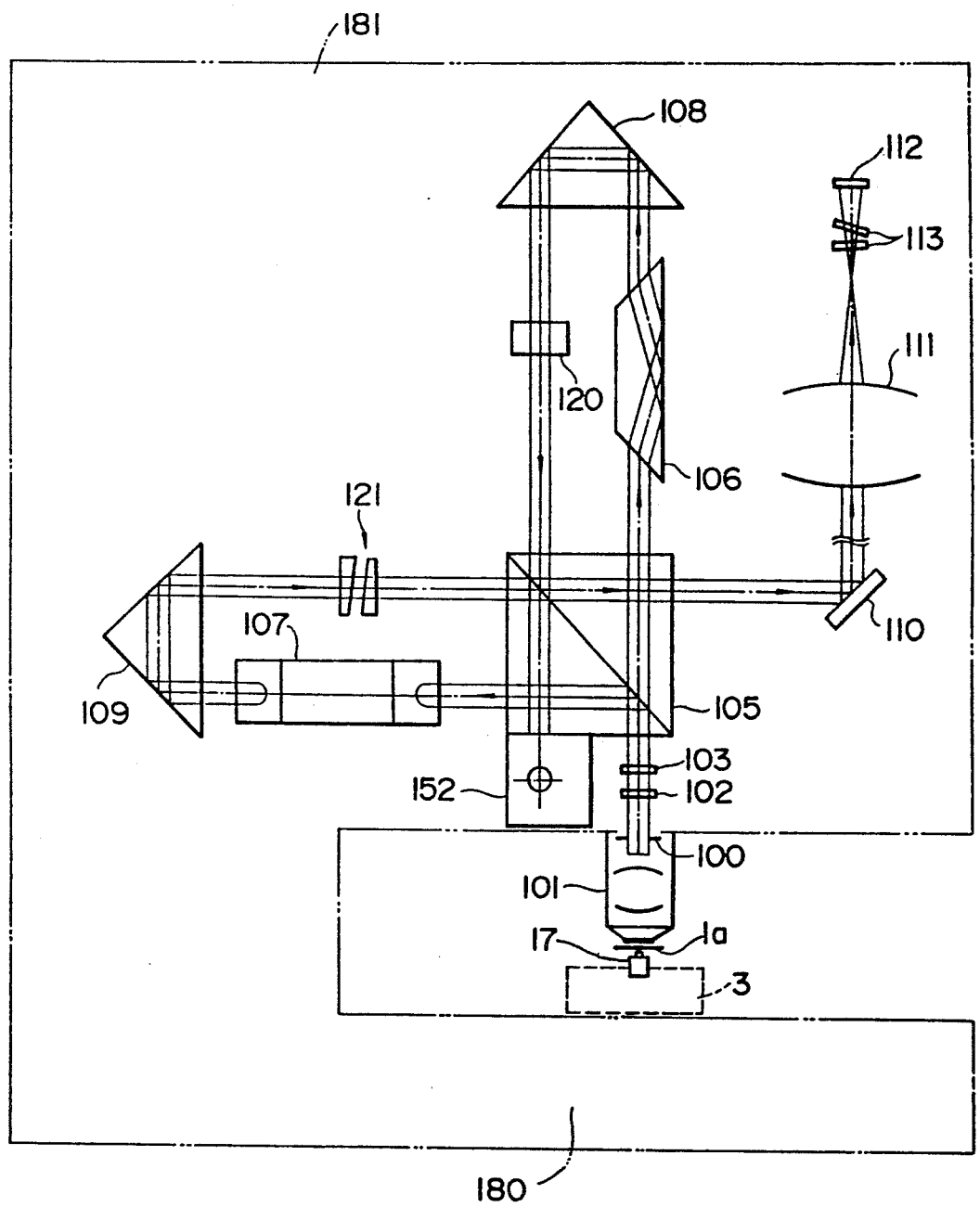

F I G. 22
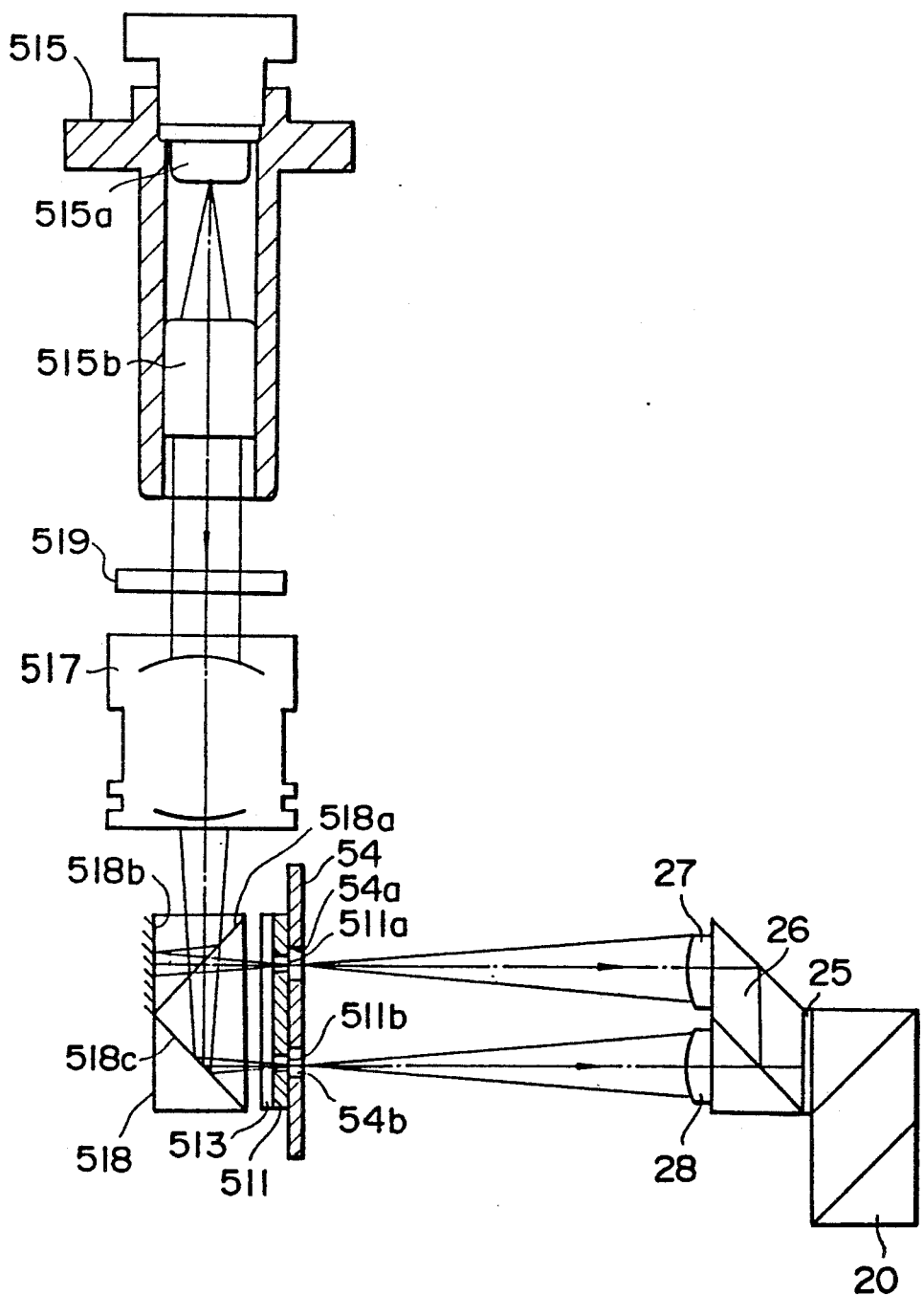

WAVE FRONT ABERRATION MEASURING APPARATUS

BACKGROUND OF THE INVENTION

1. Field of the Invention

The present invention relates to a wave front aberration measuring apparatus for use in an optical disk apparatus and a laser beam printer, for example, for obtaining a spot image by focusing a laser beam from a laser source through an imaging lens, and more particularly to an apparatus for measuring an astigmatism and coma aberration.

2. Description of the Prior Art

An optical system of a magneto-optical disk apparatus, for example, is one type optical system as mentioned above. This optical system focuses a laser beam from a laser source upon the disk by an objective optical system, records information on the disk and reproduces information from a disk. A laser flux must be focused on the disk into a spot as small as the diffraction limit or so in order to accurately record and reproduce the information. Additionally, the astigmatism or the coma aberration of the laser beam focused upon the disk must be reduced as much as possible.

When the wave front of the laser beam incident on the disk has an astigmatism, separation results in a focusing position in the vertical plane and a focusing position in the horizontal plane results, and the laser beam cannot be sufficiently focused. Also when the central axis of the laser beam is inclined relative to the optical axis of the objective optical system, a coma aberration will occur and the spot upon the disk will enlarge.

Accordingly, this kind of optical system requires both the measurement of the astigmatism and coma aberration of the beam incident on an object, and correction of each aberration based on the measurement.

Japanese Patent Laid-open Publication No. Sho 61-109105 discloses a conventional correcting method of astigmatism. The method mentioned in the Publication is that the wave front of a light beam having an astigmatism emitted from a laser diode is corrected before incidence on an objective optical system by an anamorphic optical system.

However, an astigmatism generated by optical elements placed between an anamorphic optical system and the disk can not be eliminated by the correction of an astigmatism of light beam through the anamorphic optical system. In order to completely eliminate astigmatism of the beam focused on the disk, the aberration generated by the optical element must be reduced. Since very high accuracy is required in making these optical elements placed between the anamorphic optical system and the disk, the cost of making these elements are great. The flattening of a mirror requires especially high accuracy since a mirror of low flatness generates a large astigmatism.

In a conventional method for measuring the inclination of a central axis of a light beam and an optical axis of an objective optical system to thereby measure a coma aberration, a He-Ne laser beam, for example, is first made incident on an objective optical system perpendicular to an optical disk. The beams reflected by each surface of the lenses comprising an objective optical system interfere with each other. The interference fringes are projected onto a screen, and finally the inclination of the objective optical system is measured.

However in the conventional measuring method of an objective optical system, the inclination of the optical axis of an objective optical system cannot be measured with high accuracy because interference fringes occur by superposing all beams reflected from each surface of the lenses comprising the objective optical system, and the inclination or the dislocation of the axes of the lenses affects the interference fringes. Additionally, since this method requires a He—Ne laser apparatus, etc., the costs are greater than a single-purpose method of measuring inclination.

With regard to the measurement of a coma aberration, a highly accurate analysis can be gained by computerizing an interference fringe using an ZYGO 8100 interferometer (a trade name of ZYGO Co. Ltd.). This method is not only costly, but also cannot gain the real time result of the measurement. Therefore, it has been difficult to adjust the inclination of an objective optical system and at the same time confirm the result of the measurement.

SUMMARY OF THE INVENTION

The present invention seeks to overcome the above-mentioned deficiencies. One object of the present invention is to provide an apparatus for measuring an astigmatism with high accuracy.

Another object of the present invention is to provide a method for correcting an astigmatism despite the accuracy of finishes of optical elements.

Still another object of the present invention is to provide a measuring apparatus, in which an inclination of an objective optical system can be adjusted while a coma aberration of a light beam focused upon a disk is being measured with high accuracy.

BRIEF DESCRIPTION OF THE DRAWINGS

FIG. 13 is a schematic view of an optical system showing a third embodiment of an optical wave front astigmatism measuring apparatus in accordance with the invention;

FIG. 22 is a partially enlarged view of the device of FIG. 21;

DETAILED DESCRIPTION OF THE PREFERRED EMBODIMENTS

The embodiments of the present invention will now be described in greater detail with reference to the drawings.

First, an optical system of a magneto-optical disk apparatus as an example of a measuring object will be described, then five embodiments of a wave front aberration measuring apparatus of the present invention will be described.

Figure 1:
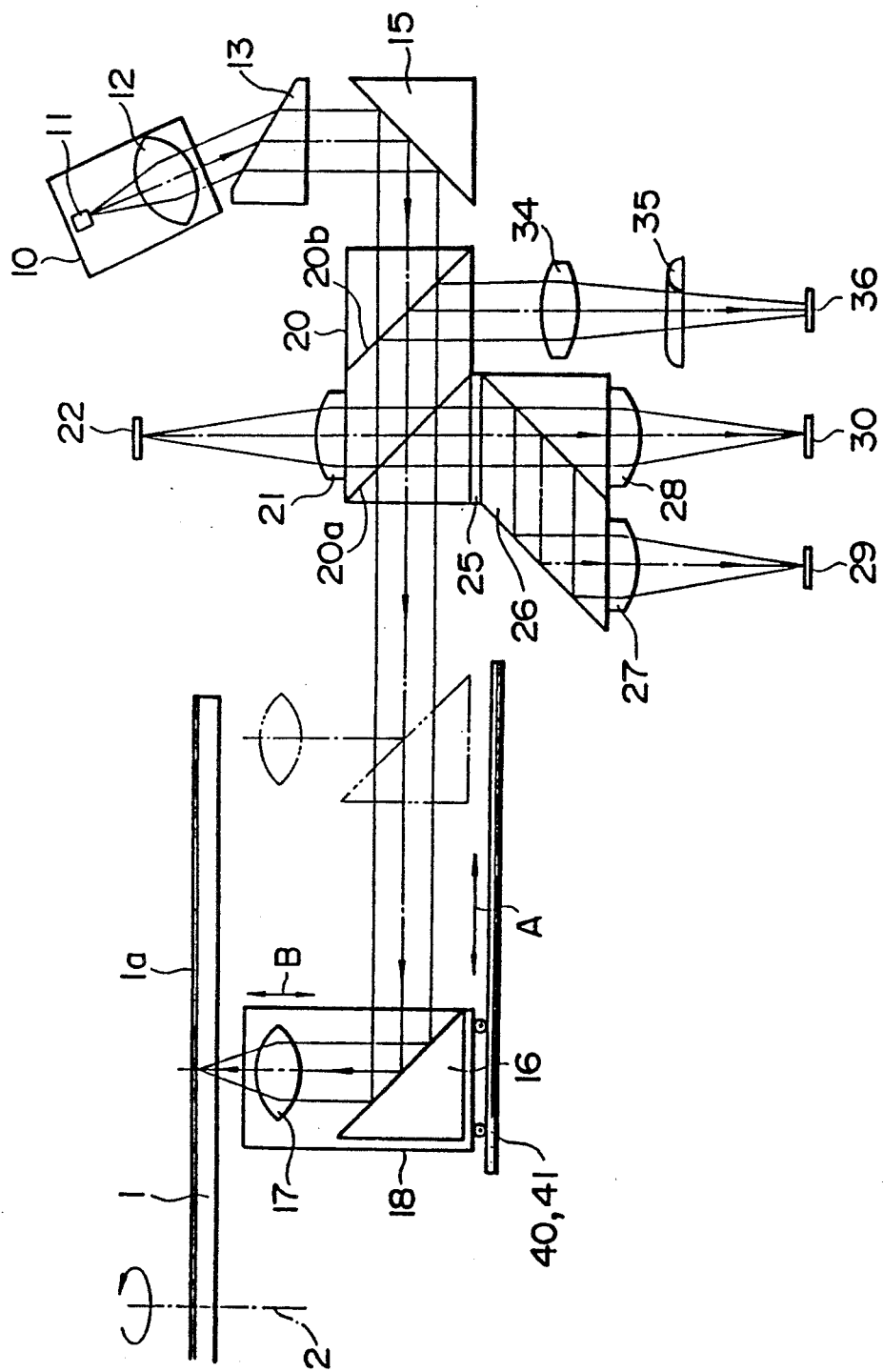
FIG. 1 is a schematic view showing a magneto-optical disk apparatus as a measuring object of the invention.

FIG. 1 shows an optical system of an optical information recording and reproducing device. A magneto-optical disk 1, serving as an information storage medium, is rotatable on an axis 2. A laser beam is applied to a magnetic thin film 1a formed on the upper surface of the magneto-optical disk 1, so as to change the direction of magnetization of that portion of the magnetic thin film 1a on which a spot (pit) is formed by the laser beam, thereby storing digital information.

While this approach enables information to be written and read easily, it is necessary to focus the laser beam accurately to a spot of about 1 μm diameter on the magnetic thin film 1a of the magneto-optical disk 1.

A laser pen 10 contains a laser diode (LD) 11 and a collimator lens 12. The laser diode 11 emits a divergent oval-shaped laser beam. The collimator lens 12 forms the emitted laser beam into a beam of parallel rays, and a light-emitting point of the laser diode 11 is disposed in the vicinity of the focal point of the collimator lens 12.

The incident oval-shaped laser beam is refracted by an anamorphic prism 13 only in a direction parallel to the junction surface of the laser diode 11 (i.e. in the direction of the plane of the sheet of FIG. 1) and is enlarged, so that a laser beam with a circular cross-section exits out of the anamorphic prism 13.

A fixed mirror 15 and a movable mirror 16 are disposed so as to be opposed to each other. The laser beam passing through the anamorphic prism 13 is reflected by the fixed mirror 15 and then is reflected by the movable mirror 16. The reflected beam then passes through an objective lens 17, so that the laser beam is focused on the magnetic thin film 1a of the magneto-optical disk 1.

Figure 2:
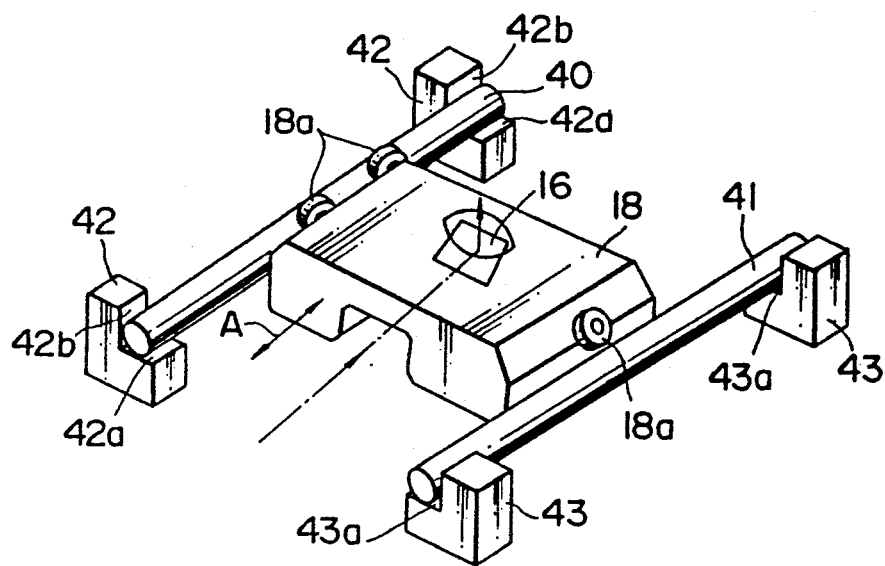
FIG. 2 is a perspective view showing the connection between guide rails and a carriage of the apparatus of FIG. 1.

The movable mirror 16 and the objective lens 17 are mounted integrally on a carriage 18. In FIG. 2, the carriage 18 is supported by a standard guide rail 40 and an auxiliary guide rail 41 which are spaced apart parallel to each other, and is movable in the radial direction of the disk. The carriage 18 has two wheels 18a in contact with the standard guide rail 40 and one wheel 18a with the rail 41. The standard guide rail 40 is detachably placed on mounts 42 fixed to the base (not shown), the auxiliary guide rail 41 being on mounts 43. The mount 42 comprises a horizontal surface 42a contiguous to the lower part of the guide rail and a vertical surface 42b contiguous to the side part of the rail. And in the same manner. The mount 43 comprises a horizontal surface 43a and a vertical surface 43b.

By the above-mentioned configurations, since the carriage 18 can move in the radial direction of the disk, the beam spot focused by the objective lens 17 can gain access to the disk 1 in order to reproduce information from optional tracks of the disk.

A beam splitter 20 is fixed between the fixed mirror 15 and the movable mirror 16. The beam entering the beam splitter 20 from the side of the fixed mirror 15 is split by a first half-mirror surface 20a, and is passed through a first condenser lens 21 to be focused on a first photoelectrical element 22 for monitoring laser output.

The beam passing through the beam splitter 20 and reflected by the magneto-optical disk 1 is returned to the beam splitter 20. The beam split by the first half-mirror surface 20a passes through a half wavelength plate 25, and the direction of the polarizing plane is turned by 45°. Then, using an auxiliary beam splitter 26, the beam is split further by a polarizing reflecting surface disposed at an angle of 45° with respect to the polarizing direction, so that the beams pass respectively through second and third condenser lenses 27 and 28 and are focused respectively on a second photoelectric element 29 for S-polarized intensity detection, and on a third photoelectric element 30 for P-polarized intensity detection. Reading of the information is effected by output signals from the second and third photoelectric elements 29 and 30.

The beam which is reflected by the magneto-optical disk 1 is split by another half-mirror surface 20b of the beam splitter 20, and passes through a fourth condenser lens 34, a cylindrical lens 35, and is focused on a fourth photoelectric element 36 which outputs a servo signal for effecting focusing and tracking. The focusing servo causes the objective lens 17 to move finely in a direction B, along an optical axis of the objective lens 17, so that a minimum diameter spot of the laser beam is focused on the surface of the magnetic thin film 1a of the magneto-optical disk 1. The tracking servo causes the objective lens 17 to move finely in a direction A (a radial direction of the magneto-optical disk 1) so as to control the laser beam in such fashion that the laser beam spot will not become displaced out of the track. In this case, a light receiving surface of the fourth photoelectric element 36 is divided, for example, into four or more parts, and the signal for the focusing servo and the tracking servo is obtained by combining signals from the various parts.

Figure 4:
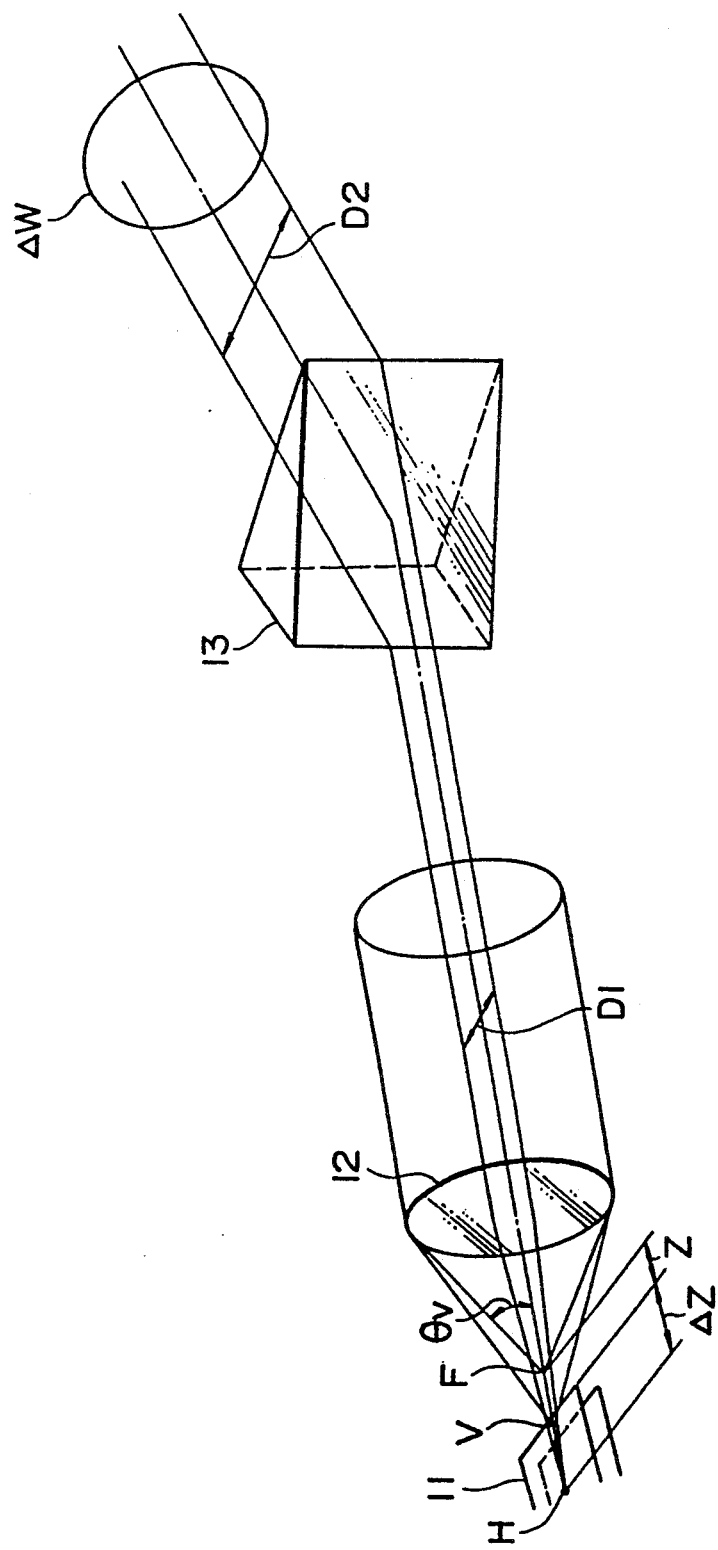
FIG. 4 is an enlarged view of a light source of FIG. 1.

Next, an astigmatism, referring to FIG. 4, which is a partially enlarged view of FIG. 1, will be described.

The character H in FIG. 4 designates a light-emitting point of a horizontal direction to a pn-junction plane of a laser diode 11 (hereinafter referred to as horizontally emitting point), and the character V designates an emitting point of a vertical direction to a pn-junction plane (hereinafter referred to as vertically emitting point). The wave front of the laser beam with a circular cross section emitted from an anamorphic prism 13 has the amount of defocused wave front aberrations (hereinafter referred to as defocused aberrations) in the horizontal direction to the pn-junction plane, $\Delta Wh$ and in the vertical $\Delta Wv$. These defocused operations $\Delta Wh$, $\Delta Wv$ are as follows:

$$\Delta Wh = (Z + \Delta Z)(NA)^2 / (2M^2) \quad \Delta Wv = Z(NA)^2/2$$

wherein $\Delta Z$: an astigmatic difference of the laser diode (that is a distance between two emitting points H, V)

Z: a distance between the vertical emitting point V and the focal point F of a collimator lens 12

NA: numerical aperture of a laser beam made incident to the collimator lens 12 in the direction vertical to the pn-junction plane ($NA = \sin \phi v$)

M: anamorphic ratio of an anamorphic optical system (that is the ratio of the maximum magnification to the minimum magnification ($M = D2/D1$)).

Therefore, $\Delta Was$, the amount of the wave front aberration of an astigmatism (hereinafter referred to as astigmatism) which the wave front of the laser beam emitted from the anamorphic prism 13 is:

$$\Delta Was = \Delta Wh - \Delta Wv$$
$$= \{\Delta Z + Z(1 - M^2)\}(NA^2)/(2M^2)$$

An astigmatism as a function of Z is generated between the horizontal and vertical cross sections to the pn-junction plane.

Consequently, $\Delta Was$, an astigmatism which a laser beam has at the position where it exits out of the anamorphic prism 13, is adjustable by changing the distance Z between the laser diode 11 and the collimator lens 12.

In the magneto-optical disk apparatus shown in FIG. 1, the distance Z between the laser diode 11 and the collimator lens 12 can be adjusted so as to obtain the following formula:

$$\Delta Was = -\alpha$$

where $\alpha$ is an astigmatism generated by elements placed between the disk 1 and the anamorphic prism 13, i.e., a fixed mirror 15, a beam splitter 20, a movable mirror 16 and an objective lens 17. Adjustment of distance Z can make the astigmatism of the laser beam focused upon the disk, zero (0) because the astigmatism $\alpha$ generated by the optical elements placed between the disk and the anamorphic prism 13 offsets the astigmatism $\Delta Was$ upon the position of the outgoing laser beam from the anamorphic prism 13.

Figure 5:
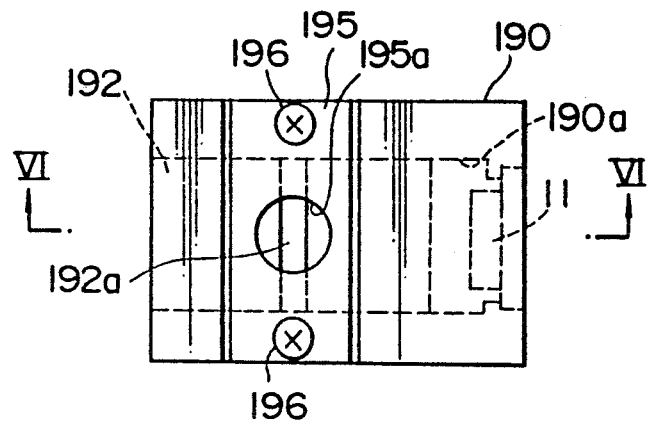
FIG. 5 is a plan view of a laser pen of the apparatus of FIG. 1.
Figure 6:
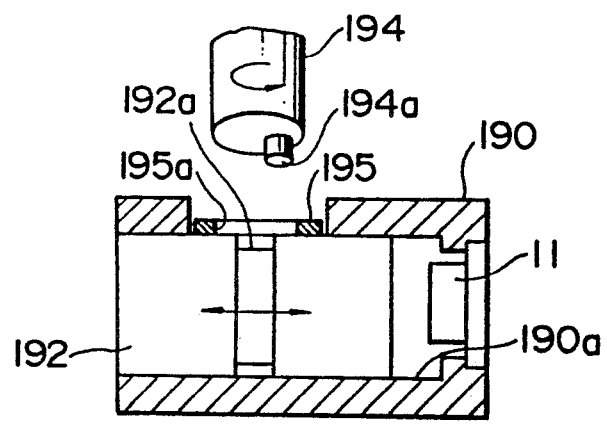
FIG. 6 is a cross sectional view taken along the line VI—VI of FIG. 5.

FIGS. 5 and 6 show one configuration for adjusting the length between the laser diode 11 and the collimator lens 12.

The laser diode 11 is fastened to the edge portion of hole 190a formed in the casing 190 of the laser pen 10. A lens frame 192, including the collimator lens 12, is slidably disposed inside hole 190a. A part of the wall of the casing 190 is cut out. A presser plate 195 for fastening the lens frame 192 in the cut-out part is fastened to the casing by screws 196, 198. A channel 192a is formed on the wall periphery of the lens frame 192. An adjusting hole 195a is formed in the center of the presser plate 195. In adjusting the length between the diode 11 and the lens 12, first the screws are loosened, a cylindrical adjusting rod 194 is inserted into the hole 195a, and then an eccentric pin 194a which is in the tip of the adjusting rod 194 is meshed with the channel 192a, and the lens frame 192 is slided by rotating the adjusting rod 194 on the axis. After obtaining the length of a desired value, the screws are fastened and the lens frame 192 is fixed to the casing by the presser plate 195.

The correction method mentioned above changes the length between the laser diode 11 and the collimator lens 12 thereby breaking the parallel condition of the laser beam emitted from the collimator lens 12. Therefore, the laser beam spot focused upon the disk will be moved out of its original position if the positions of other optical elements are the same as before adjustments. Non-parallel condition of the incident laser beam generates a spherical aberration since the objective lens is designed to have highest efficiency with incidence of a parallel beam. However, the problem of dislocation of the spot does not matter because the objective lens is automatically moved so that the spot coincides with the disk plate by the above-mentioned focusing servo. The small amount of spherical aberration is virtually eliminated.

(1) First embodiment

Figure 7:
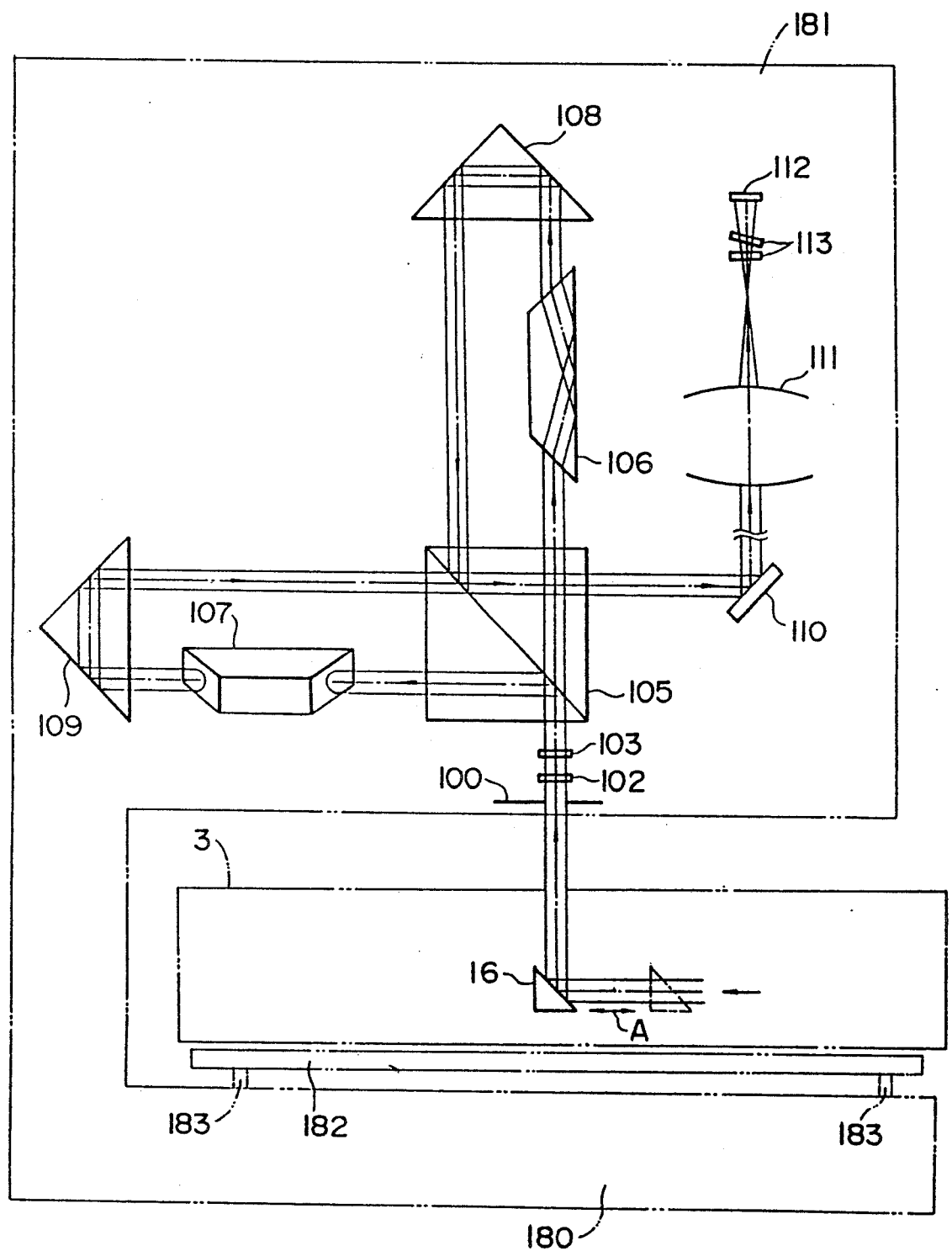
FIG. 7 is a schematic view showing an optical system of a first embodiment of an optical wave front aberration measuring apparatus in accordance with the present invention.

FIG. 7 shows a first embodiment of a wave front aberration measuring apparatus. The apparatus in the embodiment measures astigmatism of a laser beam as follows: first, the laser beam emitted from a measuring object is divided into two beam fluxes, second, these divided beams are rotated relatively by 90°, then the beams are superposed and interfered, and finally, the interference fringes are measured.

The apparatus in FIG. 7 comprises a base 180 for supporting the apparatus, a main body 181 including the optical system, and a table 182 for mounting a measuring object. The table 182 on the base is supported by telescopic cylinders 183 in order to incline the measuring object.

The character 3 designates an optical system with an objective lens 17 removed from the optical unit of the magneto-optical disk apparatus as an optical system as an object measured to be shown in FIG. 1.

The laser beam reflected by movable mirror 16 has its diameter determined by a diaphragm 100, and the polarization condition and polarization direction of the beam are adjusted by a λ/4 plate (quarter wavelength plate) 102 and λ plate (half wavelength plate) 103 which can rotate on the optical axis independently and respectively. The λ/4 plate 102 works to convert a circular polarized light into a linearly polarized light, for example, and the λ/2 plate 103 works to rotate the direction of linearly polarized light by 90°. The light beam incident on the magneto optical disk apparatus in FIG. 1 is a linearly polarized light beam, and in a compact disk apparatus is a circular polarized light beam. Generally, since the reflectivity of a mirror surface of a prism, etc. changes according to the polarization condition of incident light, the difference of the incident light according to the apparatus occasionally causes a quantitative unbalance in the divided light beams. A constant quantity of the laser beam is maintained by adjustment of the wavelength plates 102, 103.

The laser beam through the λ/2 plate 103 is divided into two beam fluxes by a beam splitter 105. One flux passing through the splitter 105 is rotated on the axis in a 45° angle by a first image rotator 106, and then is reflected by a right angle prism 108, and again enters the splitter 105. The other light flux reflected by the splitter 105 is rotated on the axis in a 45° angle by a second image rotator 107, and then reflected by a right angle prism 109, and again enters into the splitter 105.

The image rotators 106 and 107 in this embodiment each adopt the same Dach prism in shape and characteristics. However, in addition to this configuration, the scope of the invention further includes a configuration of installing an image rotator for rotating a beam on the axis in a 90° angle in only one optical path.

The right angle prism 108, 109 are rectangular prisms for reflecting the beam emitted from the image rotators in the opposite parallel direction. The prisms 108, 109 both have the same function in order to obtain a high coherence. At least one prism is slidable in the axial direction so as to change the condition of interference fringes. In this embodiment, prism 108 is slidable in the axial direction as illustrated by an arrow X in FIG. 7.

The two beams again entering the beam splitter 105 have been rotated relatively by 90°, and are superposed, and then interfere with each other, and next enter an imaging lens 111 via a mirror 110. The lens 111 forms the image of the diaphragm 100 on an image sensor 112 such as a CCD image sensor. The output of the image sensor, through a picture processing device, is input to a CRT monitor (not shown), for example, which displays the wave front aberration of the beam as interference fringes. Two polarizing filters 113, independently and rotatably pivotable on the axis, are disposed between the imaging lens 111 and the image sensor 112. The rotation of the filters changes the quantity of the beam to the image sensor 112. Even one polarizing filter can adjust the quantity to some extent. An ND filter can be adopted in place of the polarizing filter. The laser diode 11 of the magneto optical disk apparatus emits the laser beam first, and the beam reflected by the mirror 16 is incident into the splitter 105 for measurement. The incident beam is divided into two parts, and then rotated relatively on the axis in a 90° angle, superposed and interfered. The interfered laser beam is imaged on the image sensor 112 by the lens 111.

Figure 8:
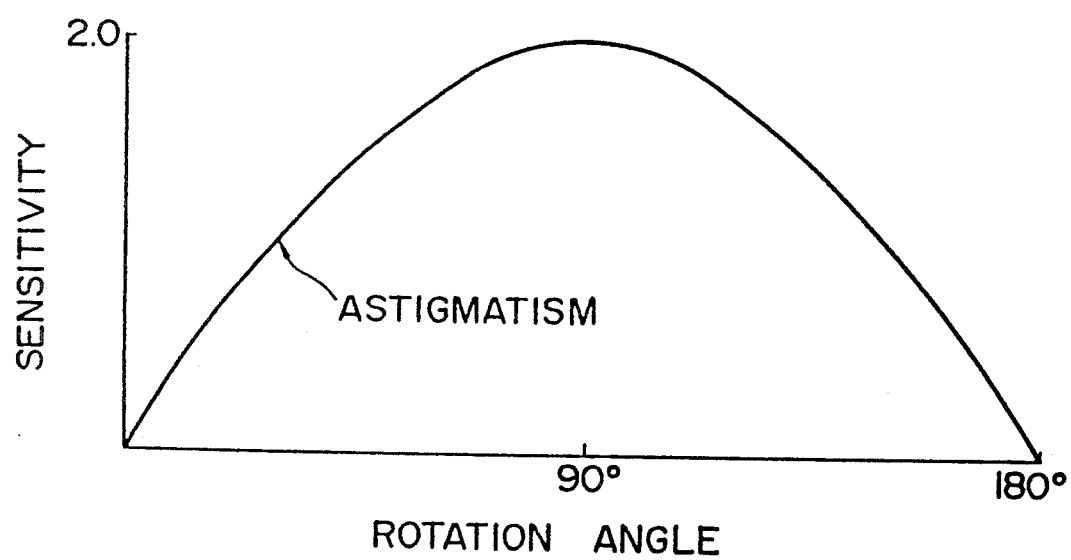
FIG. 8 is a graph showing the relation between the relative rotation angles of the two beam fluxes and a sensitivity of an astigmatism by the interference fringes by the apparatus of FIG. 7.

Next, the signal from the image sensor 112 is displayed on a CRT monitor (not shown). Since the table 182 is inclined, optical unit 3 is inclined against the base 180 of the measuring apparatus so that two to four fringes may appear on the monitor. Since the interference fringes constitute two beams rotated relatively on the axis by 90°, an astigmatic or a coma aberration as a component asymmetrical to the axis is detected. But the defocus component cannot be detected because of its symmetry to the axis. In other words, an astigmatism can be detected as a curvature difference of a wave front between the two planes perpendicular to each other including the axis, and the effect of the astigmatism is stressed by the superposing after rotation of the divided beam relatively in a 90° angle. FIG. 8 shows the relation between the angle of a relative rotation of the beam and the sensitivity of the astigmatism in the interference fringes having the maximum at a 90° angle.

When the distance between the collimator lens 12 and the laser diode 11 is being changed so as to eliminate the astigmatism only the astigmatism is detected. And accordingly, it is easier to adjust over the observation of the interference fringes.

Figure 9A:
FIGS. 9A through 9C show defocus components of a wave front of a laser beam.
Figure 9B:
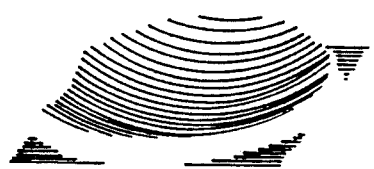
Figure 9C:

The above relation will be described with reference to FIGS. 9 and 10. Rotation of the beam on the axis does not give an effect to the wave front of the beam, including the defocus as a rotationally symmetrical wave front aberration. The wave fronts emitted from the image rotators 106, 107 have the same shape as shown in FIGS. 9A and 9B respectively. And thus, the difference of the two wave fronts forms a flat surface which cannot be detected as interference fringes as in FIG. 9C.

Figure 10A:
FIGS. 10A through 10C show components of astigmatism of a wave front of a laser beam.
Figure 10B:
Figure 10C:
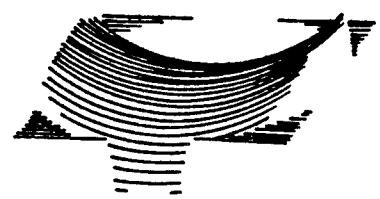

If the beam includes an astigmatism of a rotationally asymmetrical wave front, the wave front passing through the image rotators 106, 107 have different directions to each other as in FIGS. 10A, 10B. The difference of the wave fronts after interfering appears as a component curved outwardly and opposite in the two directions perpendicular to each other as in FIG. 10C. In other words, curved interference fringes appear in the case of the astigmatism of the beam, and linear interference fringes appear in the case of the non-astigmatism. If the curved interference fringes appear, the collimator lens 12 must be moved so that the interference fringes may become linear by the prior mentioned correction method.

According to the above-mentioned measuring method, an astigmatism which is generated by elements placed between laser diode 11 and the movable mirror 16 can be corrected, but an astigmatism of the objective lens cannot be corrected. However, an astigmatism of the objective lens does not actually matter, because of the astigmatism of the other optical elements, including an anamorphic prism 13, mirrors 15, 16 which are apt to generate relatively large astigmatism.

Since a lens for converting the convergent beam from an objective lens into the parallel beam is mounted in the measuring apparatus, the measuring of an astigmatism including an objective lens can be carried out.

(2) Second embodiment

Figure 11:
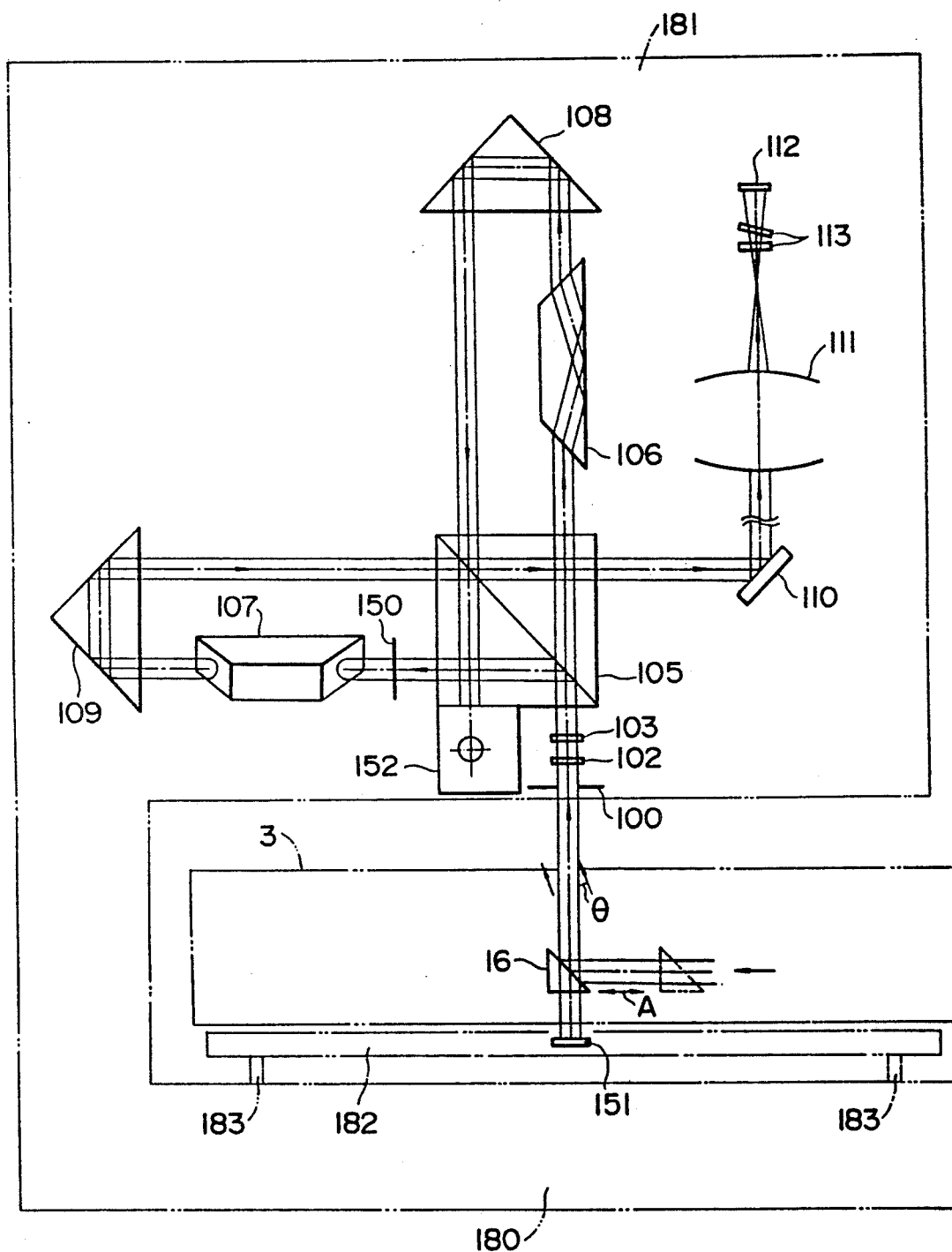
FIG. 11 is a schematic view of an optical system showing a second embodiment of an optical wave front astigmatism measuring apparatus in accordance with the invention.
Figure 12:
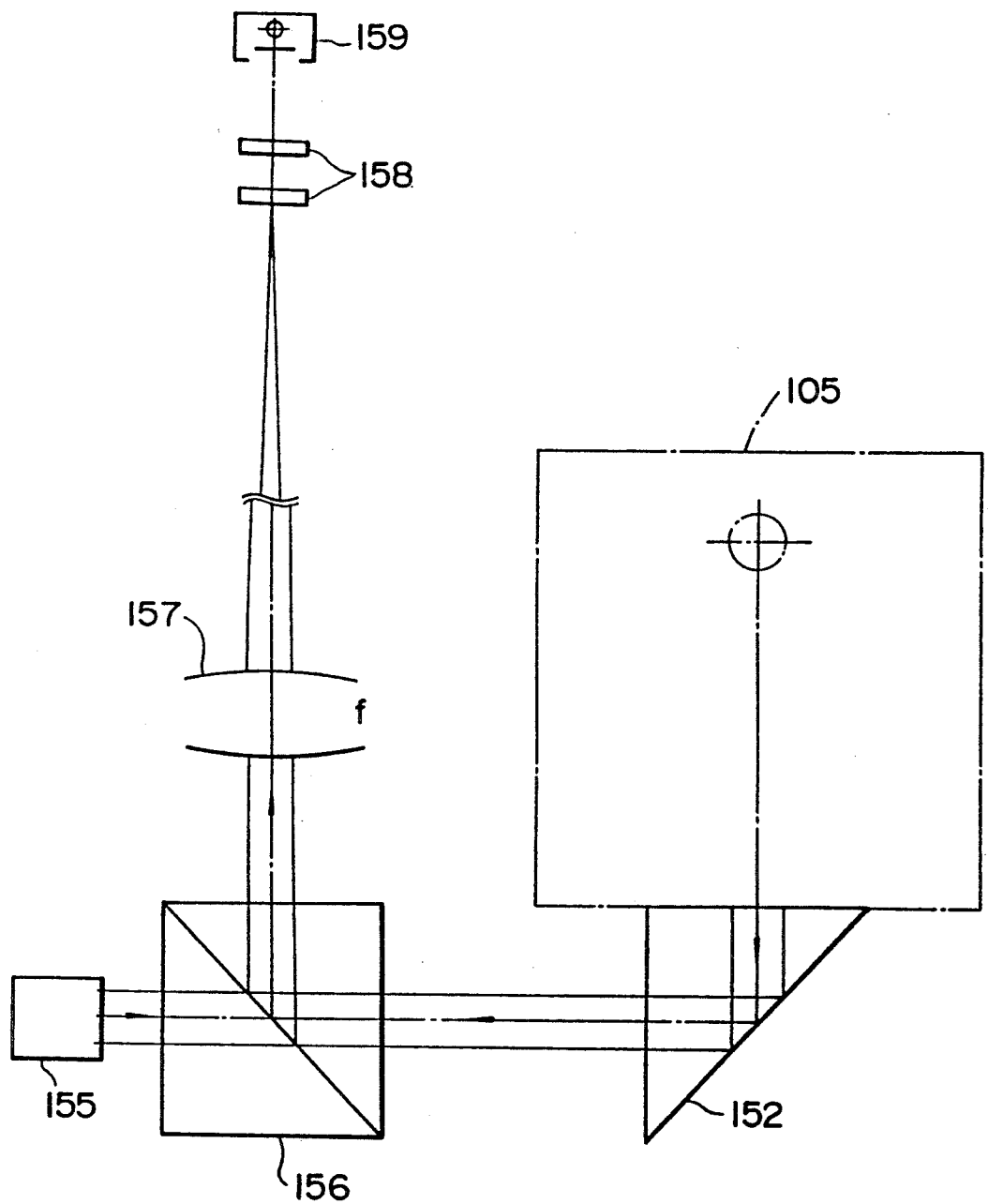
FIG. 12 is an enlarged view of a light source of the apparatus in FIG. 11.

FIGS. 11 and 12 show a second embodiment of the measuring apparatus in accordance with the invention.

FIGS. 11 and 12 show a second embodiment of the measuring apparatus in accordance with the invention.

The apparatus in the first embodiment mentioned above is used only for measuring a wave front aberration. However the measurement requirement for enhancing the usefulness of the apparatus is not only of a wave front aberration but also an intensity distribution, for example.

Convention measuring apparatus have been used for measuring a single item only (wave front aberration, for example), and plural apparatus have been needed in proportion to the number of items to be measured.

The apparatus in the second embodiment adds to that of the first embodiment, a shutter and means for detecting an inclination of the table thereby being capable of measuring both a wave front aberration and an intensity distribution. Configurations different from the first embodiment will be described hereinafter.

One difference is the disposition of a shutter 150 in the optical path between the beam splitter 105 and the image rotator 107. The shutter 150 is open in measuring a wave front aberration, and closed when measuring an intensity distribution of the laser beam. The measurement of the wave front aberration requires the interference of the two beams, while the measurement of the intensity distribution does not.

Another difference is the disposition of a device for measuring inclination of the table 182. The device can detect the inclination of the table 182 such that a beam is incident on a standard mirror 151 mounted on the table 182 and then the beam reflected by the standard mirror 151 is received by the device. The inclination-detecting device comprises a prism 152 mounted on the underside of a beam splitter 105, and a laser beam source 155 for emitting a beam to be incident on the prism 152 as in FIG. 12. The beam source 155 comprises a laser diode and a collimator lens.

The inclination of the table 182 can be measured by emitting a laser beam from the beam source 155 before setting up optical unit 3. Then, the laser beam emitted from the source 155 transmits from a second beam splitter 156, and enters into beam splitter 105 after being reflected by a prism 152. As in FIG. 11, the laser beam transmits through the half mirror surface of the beam splitter 105, a right angle prism 108, an image rotator 106, and then returns again to the beam splitter 105, and is reflected by the standard mirror 151 mounted on the table 182. The laser beam reflected by the standard mirror 151 reaches the second beam splitter 156 (shown in FIG. 12) through the same path as above, is reflected by the beam splitter 156, condensed by a condenser lens 157, and is incident into a TV camera 159 for alignment.

Two polarizing filters are disposed between the condenser lens 167 and the TV camera 159, similar to those between an imaging lens 111 and an image sensor 112.

The output of the TV camera 159 is displayed on a CRT monitor (not shown), and light spots appear on a screen of the CRT monitor according to the positions of the spots on the image sensor 112. A reference line is drawn at the position where light points appear corresponding to the reference angle of the table on the screen of the CRT monitor, so an operator can adjust the inclination of the table 182 such that the reference line and the light point coincide.

The inclination of the table can be measured with the shutter 150 both open and closed.

The table is first preset at the reference angle. The laser emission from the source 155 is stopped, and an optical unit 3 is mounted on the table 182. Next, a laser diode 11 of the unit 3 emits a beam with the shutter 150 closed and a part of the laser beam from the unit 3 transmits through the beam splitter 105, and passes through the image rotator 106 and the right angle prism 108, and again enters the beam splitter 105. The laser beam incident from the unit 3 and reflected by the beam splitter 105 is shut out by the shutter 150. The laser beam passed through the beam splitter 105 is reflected by the prism 152 and the second beam splitter 156, and is condensed on the TV camera 159 by the condenser lens 157. The inclination of the laser beam through the objective lens 17 emitted from the laser diode 11 can be measured by measuring the difference between the reference line and the light point on the CRT.

The incident angle $\theta$ (rad.) of the laser beam into the objective lens 17 is:

$$\theta = R/f$$

where f is the focal length of the condenser lens 167, R is the distance on TV camera 159 between the convergent point and a center point where the light is converged in case of $\theta = 0$.

The laser beam reflected by the beam splitter 105 is reflected by the mirror 110, and finally forms an image on the image sensor 112 by the imaging lens 111. The intensity distribution of the laser beam can be measured by displaying the output of the image sensor 112 on the CRT monitor.

The measurement of the wave front aberration is carried out by emitting the laser diode 11 with the shutter 160 open. And then the same procedure as in the first embodiment is followed, and the astigmatism of the laser beam is thereby measured.

Both a wave front aberration and an intensity distribution can be measured by the same apparatus in the second embodiment.

(3) Third embodiment

Figure 14:
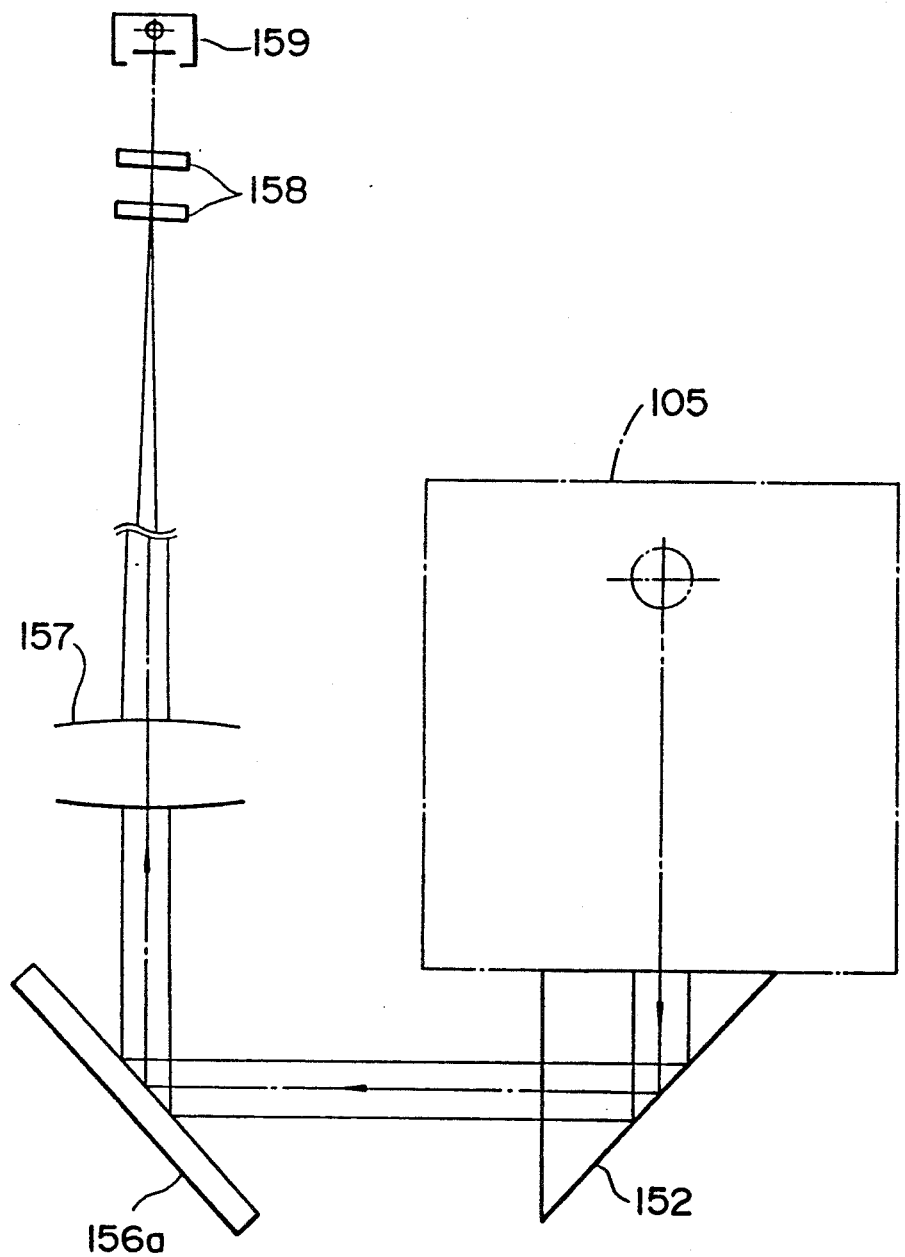
FIG. 14 is an enlarged view of a light source of the apparatus in FIG. 13.

FIGS. 13 and 14, show a third embodiment of the present invention. The third embodiment relates to the measurement of coma-aberration components of a wave front aberration.

The configuration of a measuring apparatus in the third embodiment is similar to that in the second embodiment, so the difference between the two will be described below.

First, an objective lens 101 is provided in the apparatus. The objective lens 101 works to convert the convergent beam flux emitted from the objective lens 17 of the optical unit 3, as a measuring object, into a parallel beam flux. Diaphragm 100 is disposed on the position of the exit pupil of the objective lens 101.

Additionally, the relative rotation angle of the beam flux by the image rotators 106, 107 are present at 180°.

An optical parallel plate 120 is disposed between the right angle prism 108 and a beam splitter 105 and two wedge prisms 121 are provided between the right angle prism 109 and the beam splitter 105. The wedge prisms 121, disposed rotatably on the optical axis, can incline one beam flux divided by the beam splitter 105. The inclination of one laser beam produces an optional tilt to the interference fringes for observing purposes. The optical parallel plate 120, which is the same material and thickness as the two wedge prisms 121, is fixed to the optical path, so as to equalize the distance of the tow optical paths.

Table 182 for inclining the optical unit 3 is absent. The optical axis of the measuring apparatus is perpendicular to the top surface of the base 180.

Finally the beam source 155 is absent, and the mirror 156a is provided instead of the beam splitter 156 as shown in FIG. 14. A transmission type optical disk or a transparent glass plate 1a having an optical path length equivalent to a cover glass of a reflection type optical disk is disposed between the objective lens 17 and the objective lens 101. The glass plate 1a is parallel to the base 180 of the apparatus.

The following is a brief description concerning the measurement of a coma-aberration using the apparatus of this embodiment.

Referring to FIG. 13, the optical unit 3 having an objective lens 17 is placed on base 180. A laser diode 11 inside the optical unit, emits (as shown in FIG. 1) a laser beam which is converted into a convergent beam by objective lens 17, and enters the measuring apparatus through glass plate 1a. The beam incident into the apparatus is converted into a parallel beam flux by the objective lens 101, and is divided into two parts by the beam splitter 105. The wave front of the divided beam is rotated relatively in a 180° angle by image rotators 106, 107, and the divided beams are then superposed by beam splitter 105. Part of the superposed beam is reflected by the prism 152, the mirror 156a, and is received at TV camera 159 through a condenser lens 157 as shown in FIG. 14. The other part of the superposed beam reaches the image sensor 112 through the imaging lens 111. The imaging lens 111 works to form the image of the diaphragm 100 onto the image sensor 112.

The output of the TV camera 159 and the image sensor 112 is displayed by a CRT monitor (not shown). The output of the TV camera 159 is displayed on the CRT monitor for measurement. Light spots showing the positions of the two beam fluxes divided by the beam splitter 105 are displayed on the CRT monitor. Then the disposing position of the optical unit 3 is adjusted so as to reconcile one light point with the other, and the beam flux from objective lens 101 is made to coincide with the optical axis thereof.

The image sensor 112 output shown on the CRT monitor displays the wave front aberration of the position of the diaphragm 100 as interference fringes. The observed interference fringes are the components of the differences of the wave fronts of the two divided fluxes rotated relatively by 180° on the optical axis. Thus, the detected wave front aberration is a coma aberration component asymmetrical to the optical axis at an angle of 180°. Neither the defocus component symmetrical to the axis at an angle of 180° nor the astigmatism component asymmetrical to the axis at an angle of 90° are detected as the interference fringes because of offsetting.

If the relative rotation angle by the two image rotators is set at 90°, the measurement of an astigmatism can be achieved as in the first embodiment.

Figure 15A:
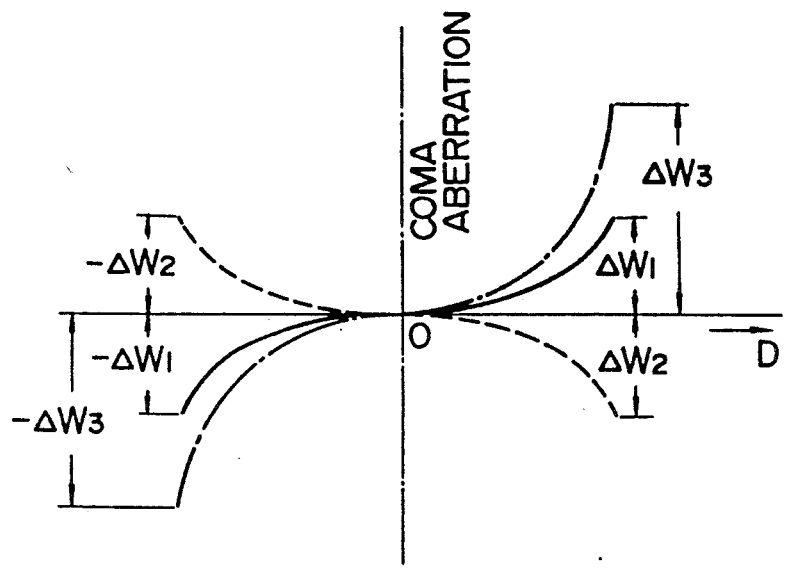
FIGS. 15A and 15B are graphs showing the characteristics of inclination of an objective lens.

FIG. 15A is a graph showing the amount of coma aberration on the image sensor according to the distance D from the axis. The solid line ($\Delta W1$) designates aberration of one divided laser beam, and the short dashed line ($\Delta W2$) designates coma aberration of the other divided laser beam. The alternate long and short dashed line ($\Delta W3$) shows a component of the difference between $\Delta W1$ and $\Delta W2$. The level of $\Delta W3$ is two times the level of $\Delta W1$ as follows:

$$\Delta W3 = \Delta W1 - \Delta W2$$
$$= \Delta W1 - (-\Delta W1)$$
$$= 2\Delta W1$$

Figure 15B:
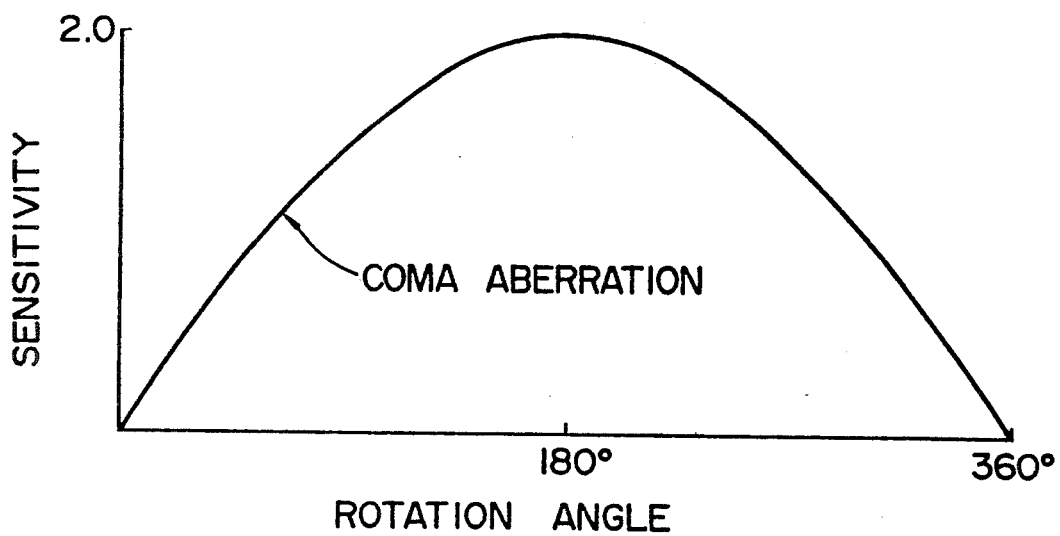

FIG. 15B is a graph showing a detection sensitivity of a coma aberration according to the rotation angle of the wave front of the beam flux on the optical axis. The coma aberration component asymmetrical to the axis of 180° appears in the interference fringes at approximately twice the sensitivity by rotating the wave front relatively by 180°.

The adjustment is to change the inclination of the objective lens 17 so as to minimize the amount of curve of the interference fringes while the detected interference fringes are being observed. Accordingly, the coma aberration including the coma aberration of the object lens 17 can be minimized.

Figure 16:
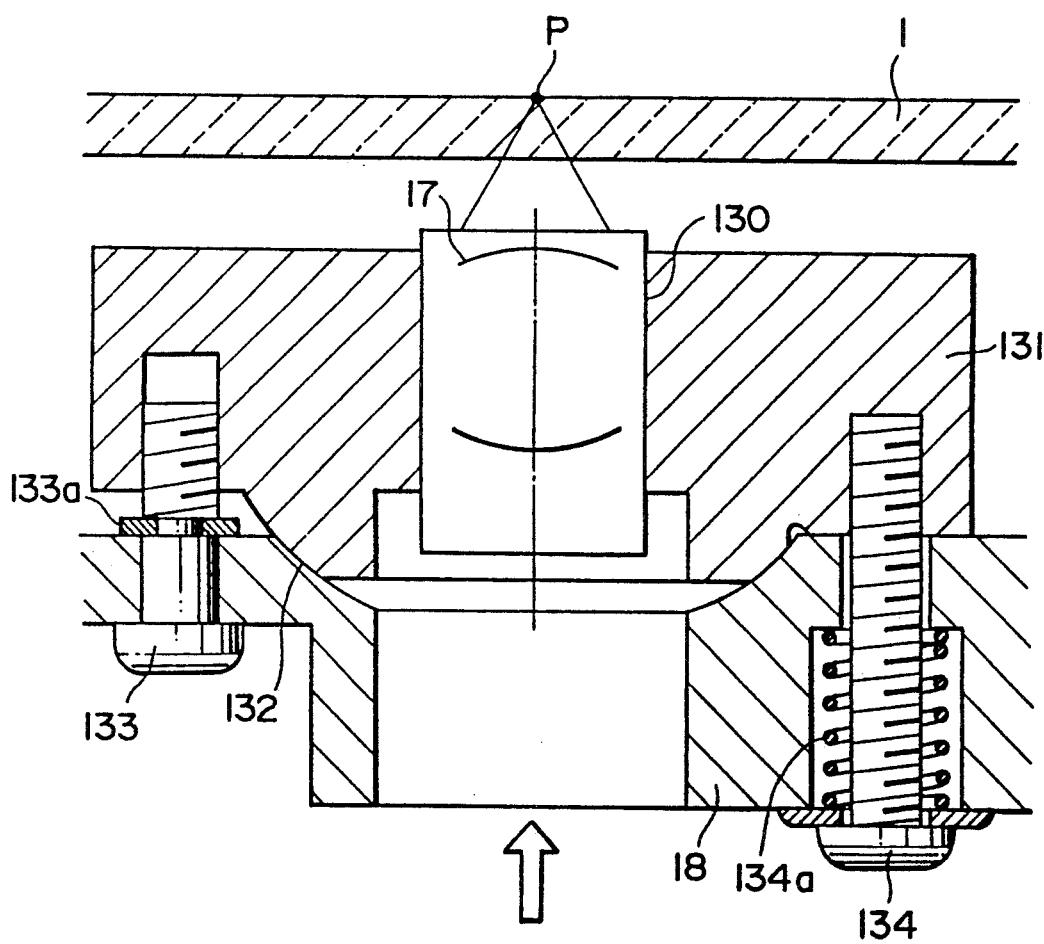
FIG. 16 is a schematic view of mechanism for adjusting inclination of a lens.
Figure 17:
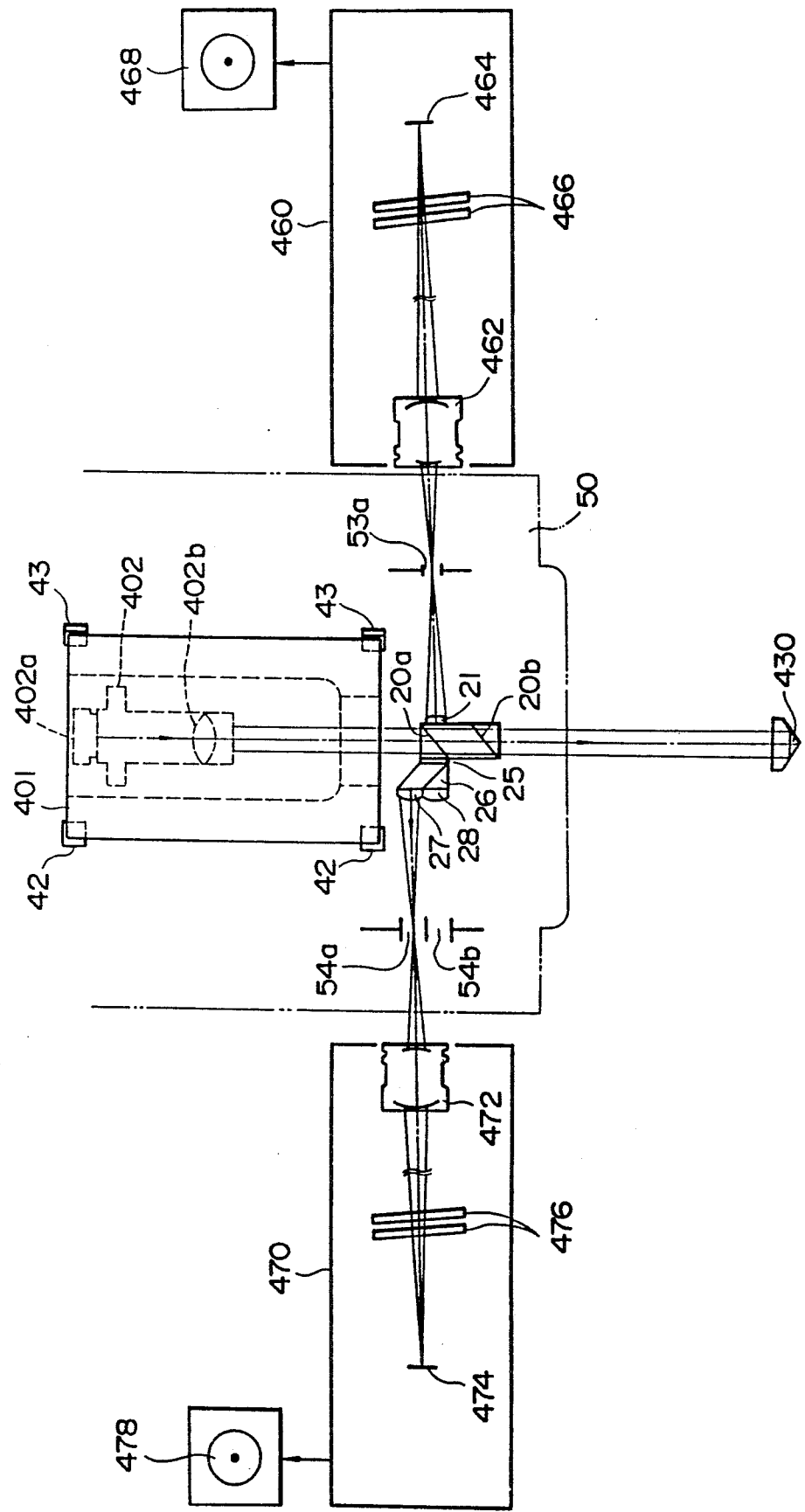
FIG. 17 is a schematic view of an optical system of an apparatus for detecting the inclination of a beam splitter of the device in FIG. 1.

FIG. 16 shows an example of a mechanism for adjusting the inclination of the objective lens 17. A lens frame 130 supporting an objective lens 17 is tiltably fastened to a supporting member 131. The supporting member 131 abuts on a carriage 18 by a spherical base 132 formed on the upside of the carriage 18. The center of curvature of the spherical base 132 is coincident with the convergent point P of the laser beam by the objective lens 17, and the position of the convergent point P is unmovable regardless of movement of the supporting member 131.

The supporting member 131 is fastened to the carriage 18 with two bolts 133, 134. Release of adjusting bolt 133 from the carriage 18 is prevented by a release preventing ring 133a and is connected with the supporting member 131. The standard bolt 134 has a tip portion connected with the supporting member 131, and has a spring 134a between the carriage 18 and head portion. The bolt 134 pulls the supporting member 131 toward the carriage 18.

The adjusting bolt 133 and the standard bolt 134 are also disposed in positions rotated by 90° angles on the optical axis of the objective lens. The supporting member 131 is fastened to the carriage 18 with four bolts.

Accordingly, the rotation of the adjusting bolt 133 moves the supporting member 131 along the base 132, thereby adjusting the inclination of the objective lens. The adjusted condition is completely kept stable by tightening the adjusting bolt 133.

(4) Fourth embodiment

FIGS. 17 through 20 show a fourth embodiment of the present invention.

The optical system of FIG. 1 has a procedure where the laser beam flux reflected by the magneto-optical disk 1 is divided, each divided laser beam is irradiated to a light receiving element, and finally the signal is received. This type of apparatus can receive the signal accurately only when the laser beam reaches the light receiving element accurately. In other words, an accurate signal can be obtained by accurate adjustment and fixation of the position and direction of the beam splitter.

The accurate installation of the beam splitter can be accomplished by the procedure wherein all optical elements are mounted on the apparatus, a laser diode emits a beam, and the laser beam is adjusted on the installation position of the light-receiving element while being detected or observed.

However, the beam splitter is usually fastened with an adhesive, hardened by the irradiation of ultraviolet rays, and adverse effects of the ultraviolet rays befall the other optical elements.

The conventional adjustment and installation of the beam splitter is carried out with mechanical tools before installing other optical elements.

But the external shape of the beam splitter, the angle of the half mirror surface, etc. are occasionally different from specifications. Thus, a uniform installation by mechanical tools produces an inaccurate introduction of the laser beam to the light-receiving element in parts such as the half mirror.

An object of the fourth embodiment is to provide a beam splitter-adjusting method, by which the position of the half mirror surface, etc. can be accurately adjusted and the beam splitter fixed, so as to introduce the laser beam accurately to the light-receiving element before other optical elements are fixed.

Figure 18:
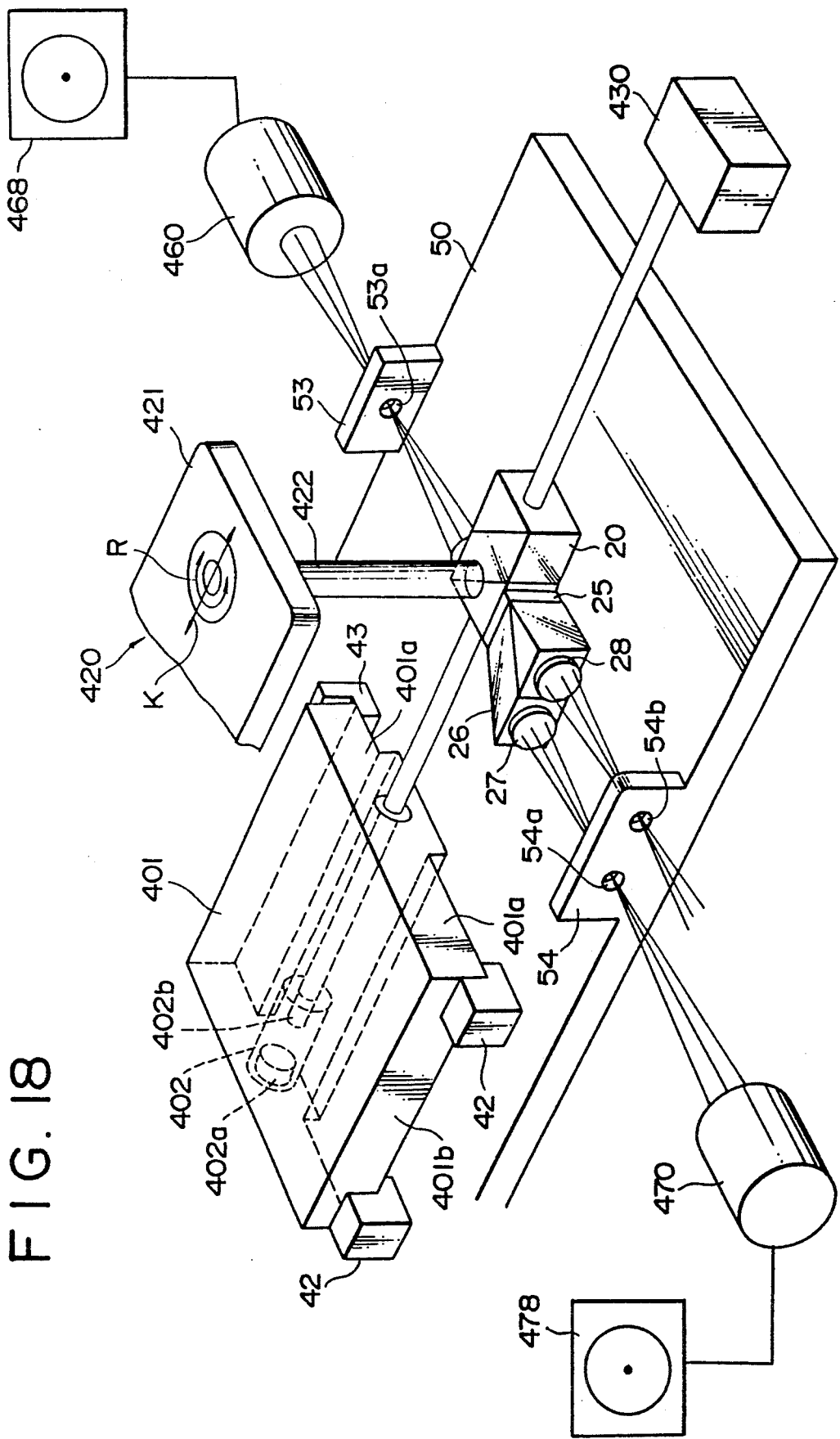
FIG. 18 is a perspective view of the device in FIG. 18.

FIG. 18 shows a configuration of adjusting the beam splitter. The character 50 designates a base comprising optical elements including a beam splitter 20, and mounts 42, 43 for mounting guide rails 40, 41 (as shown in FIG. 2). The base 50 comprises a mounting plate 53 for fixing a first light-receiving element 22 for a laser output monitor, and a mounting plate 54 for fixing second and third light-receiving elements 29, 30 for S-polarized and P-polarized beams. Plate 53 comprise a fixing hole 53a, and plate 54 comprises fixing holes 54a, 54b.

Figure 3:
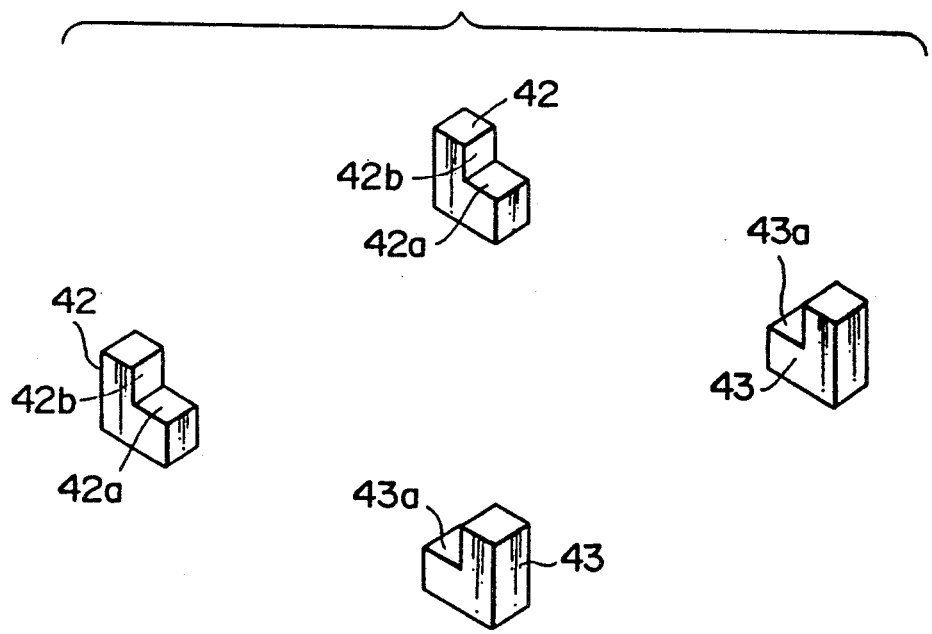
FIG. 3 is a perspective view showing mounts for the guide rails.

The adjustment and fixation of the beam splitter is as follows. A light source portion for adjusting 401 is mounted on the mounts 42, 43 which are fixed on the base 50. For fixation and mounting, the bottom surface 401a of the light source portion for adjusting must be in contact on horizontal surfaces 42a, 43a (as shown in FIG. 3) of the mounts 42, 43 and the side surface 401b of the light source portion 401 must be in contact with the vertical surface 42b of the mounting portion 42.

The light source portion 40 for adjusting comprises a laser pen 402 including a laser diode 402a and a collimator lens 402b. The laser beam emitted from the laser pen 402 is parallel to the bottom surface 401a and the side surface 401b of the light source portion 401.

Therefore, the laser beam from the laser pen 402 is parallel to the guide rails which are mounted after the measuring and coincides with the axis of the optical system of the magneto-optical disk apparatus, when the light source portion for adjusting is mounted on the mounting portions 42, 43 for guide rails 40, 41.

A narrow gap is formed between the side surface 401b of the light source portion for adjusting and the mounting portion 43.

The beam splitter 20 is then mounted on the base. The half wavelength plate 25, the auxiliary beam splitter 26 and the condenser lenses are previously adhered on the beam splitter 20. An adjusting tool 420 as shown in FIG. 18 is mounted on the top surface of the beam splitter 20. The adjusting tool 420 comprises a handle 421 and a rod 422 connected with the bottom surface of the handle 421. The tip of the rod 422 is mounted on the top surface of the beam splitter 20, and the handle 421 is rotated in the arrow R direction on the axis of the rod 422. Accordingly, the half mirror surfaces 20a, 20b of the beam splitter 20 can be rotated and moved inside the plane parallel to the base 50.

The half mirror surfaces 20, 20b are moved parallel in the direction of the optical axis according to the moving of the handle 421 in the arrow K direction along the axis of the laser pen 402.

The laser beam emitted from the laser diode 402a of the laser pen 402 is divided on the half mirror surface 20a of the beam splitter 20. The reflected component is divided into a P-polarized beam and S-polarized beam by the auxiliary beam splitter 26, and then these divided beams become convergent light beams converged by condenser lenses 27, 28.

The transmitted component enters to a corner cube 430, after transmitting through the half mirror surface 20b. The corner cube 430 whose vertical point coincides with the axis of the laser pen 420, reflects the beam through the beam splitter 20 in the completely opposite direction. A part of beam reflected by the corner cube 430 is reflected by the half mirror surface 20a of the beam splitter 20 and changed into a convergent light beam by the condenser lens 21.

The laser beam reflected through the fixing holes 53a, 54a is observed by image pickup devices 460, 470. The image pickup devices 460, 470 comprise objective lenses 462, 472 for forming the images of the fixing holes 53a, 54a on the image pickup elements 464, 474 respectively.

Polarizing filters 466, 476 are independently rotatable on the axis to adjust the quantity of light disposed between the objective lens and the image-receiving element.

The images from fixing holes 53a, 54a are formed on the image pickup elements 464, 474 by adjusting the objective lenses 462, 472.

The images from fixing holes 53a, 54a taken by the image pickup devices 460, 470 are displayed on CRT monitors 468, 478 respectively.

Figure 19A:
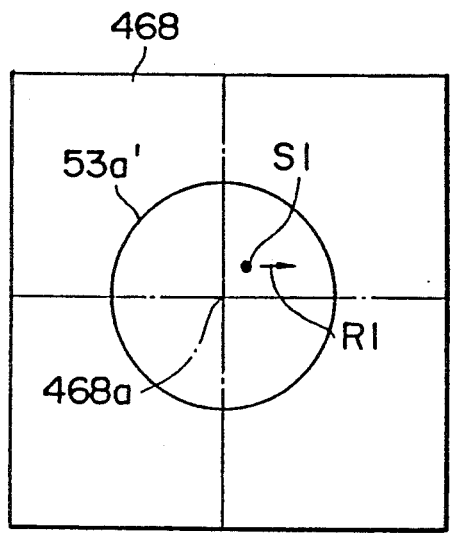
FIGS. 19A and 19B are schematic views of a monitor display in a rotating beam splitter.
Figure 19B:
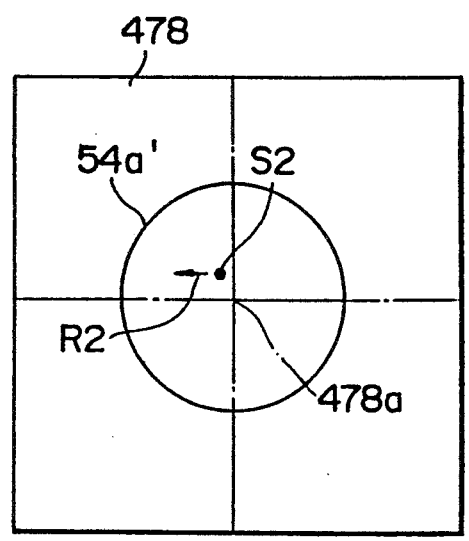

The CRT monitor 468 displays the image 53a' from fixing hole 53a and the image S1 of the convergent point of the laser beam as shown in FIG. 19A. Similarly, the CRT monitor 478 displays the image 54a from fixing hole 54a and the image S2 in FIG. 19B.

After displaying the images, the positions and directions of the image pickup devices 460, 470 are adjusted so that the reference points 468a, 478a on each CRT monitor may coincide with the centers of the images 53a, 54a. The position of the beam splitter 20 is then adjusted so that the images S1, S2 of the convergent points may coincide with the reference points respectively. The rotation of the adjusting tool 420 in the arrow R direction produces the motions of the images S1, S2 in the R1, R2 directions opposite to each other.

Figure 20A:
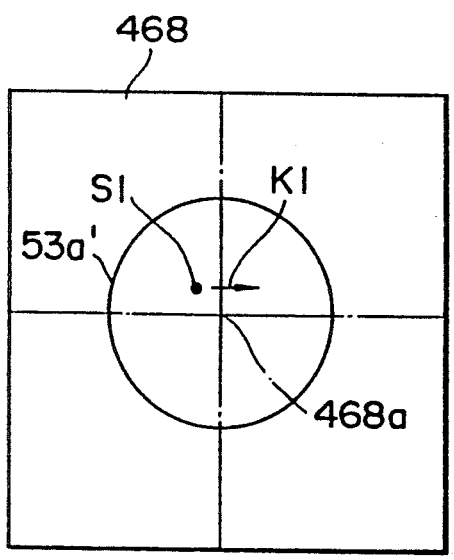
FIGS. 20A and 20B are schematic views of a monitor display in sliding beam splitters.
Figure 20B:
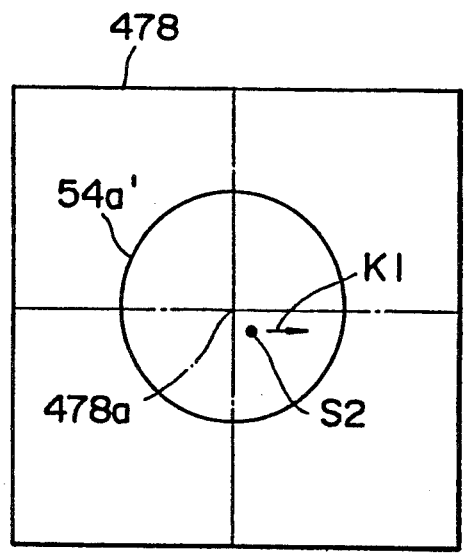

The motions of the adjustable lines in the arrow K direction produces the motions of images S1, S2 as shown in FIGS. 20A, 20B.

Images S1, S2 are adjusted to coincide with the reference lines by combinations of these motion, the beam splitter 20 is then fixed to the base 50 with the adhesives agent by the ultraviolet irradiation.

The coincidence between the images S1, S2 and the reference points means that the laser beam from the laser pen 402 focuses upon the centers of the fixing holes 53a, 54a.

Therefore, when a optical system of a magneto optical disk apparatus is formed by installing the other optical elements, a part of the laser beam emitted from the laser diode 11 is focused accurately upon the center of the first light receiving element, and a part of the reflected laser beam is focused accurately upon the center of the second light receiving element 29.

According to this embodiment, the position and direction of the half mirror surface can be adjusted accurately and easily with regard to the light receiving elements disposed on both sides surrounding the beam splitter, regardless of the outer shape of the beam splitter.

The adjustable direction in the above embodiment is horizontal to the base plane, not vertical to the plane. Therefore, the beam splitter must be exchanged when the error in the vertical direction exceeds the tolerance.

The mounting portions 42, 43 of the guide rail is utilized for mounting the light source for adjusting 401 in this embodiment. But the disposition of a pin for determining the position, for example, on the reference position of an optical system can also be used instead of the above mounting portions 42, 43.

(5) Fifth Embodiment

Figure 21:
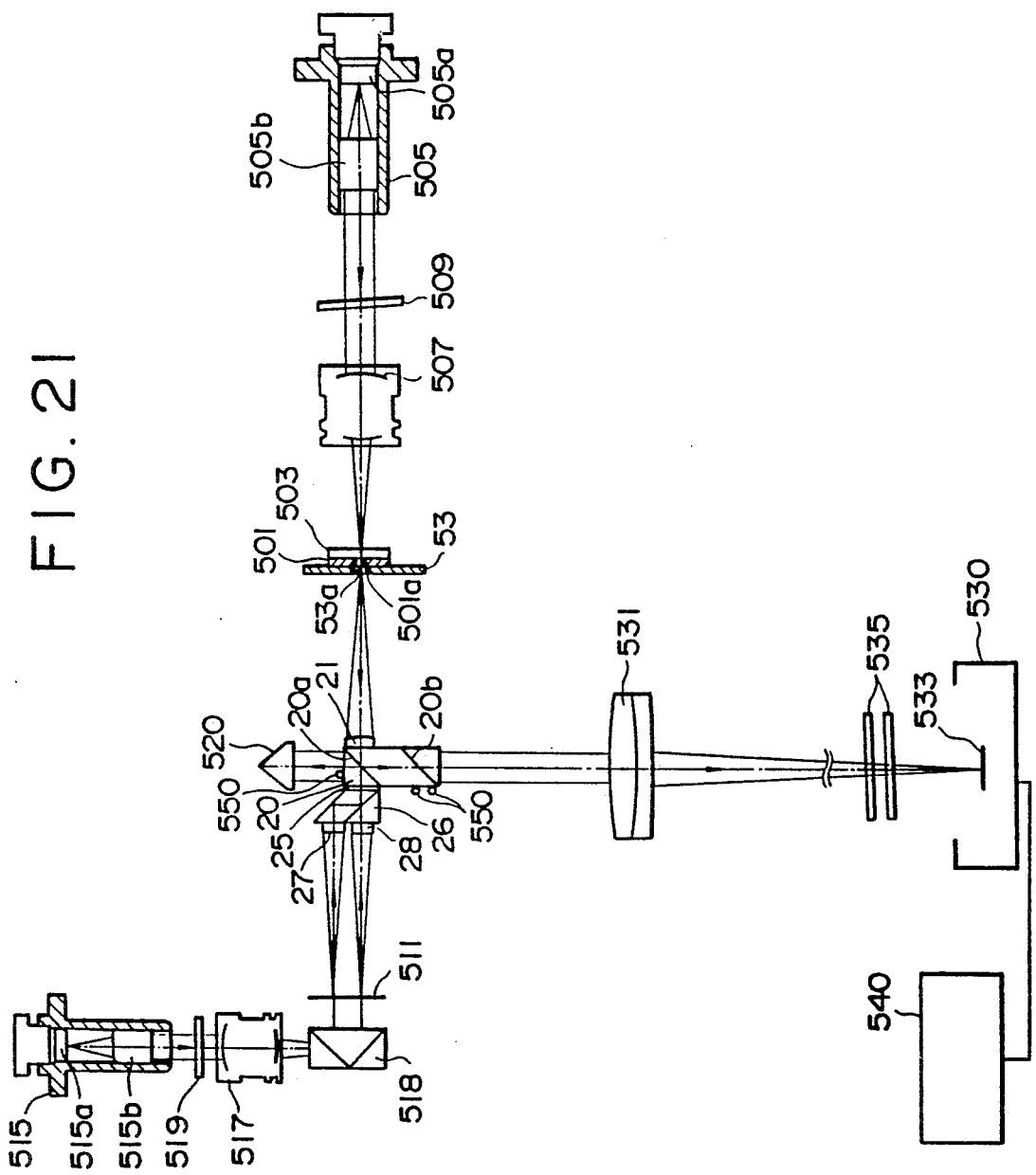
FIG. 21 is a schematic view of an optical system showing a device for inspecting a beam splitter of the device in FIG. 1.
Figure 23:
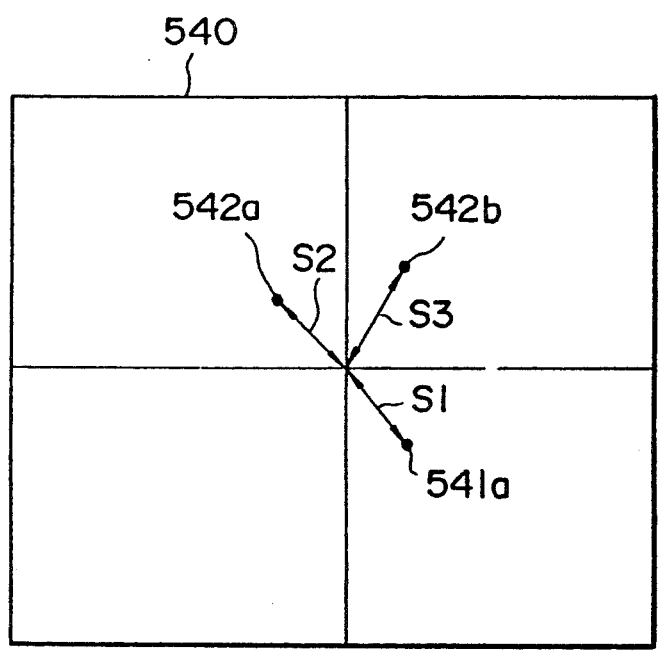
FIG. 23 is an illustrated view of a monitor inspecting the device of FIG. 21.

FIGS. 21 through 23 show a fifth embodiment of the present invention. This embodiment relates to an apparatus for measuring whether the laser beam divided by the beam splitter 20 can enter accurately into the light-receiving elements 22, 29, or 30.

In the conventional apparatus, TV cameras are disposed on the positions where the light-receiving element is located and the convergent positions are observed by another monitor from the installation position of each light-receiving element.

However, the conventional method is very costly because many TV cameras and monitors are needed in relation to the number of the light-receiving elements. Therefore, the relation between the differences among each convergent position cannot be observed on a screen of the monitor.

An object of the fifth embodiment is to provide an apparatus for eliminating the above deficiencies, by accomplishing at a low cost by simplification of the apparatus, and for observing the dislocation of each convergent position, for example, on the same image surface.

Referring to FIG. 21 and the partially enlarged section thereof in FIG. 22, this embodiment is a measuring apparatus for making each beam emitted from the laser pens 505, 515 incident to the fixing holes 53a, 54a, 54b (see FIG. 18), for mounting the light-receiving elements to the beam splitter 20, superposing these means and receiving each by a single TV camera 530. The beam splitter 20 is disposed on the reference position by positioning pins 550.

A diaphragm plate 501 including a pin hole 501a of the first chart is disposed on the incident side of fixing plate 53. A ground glass 503 is further disposed on the incident side of the plate 53. The diaphragm plate 501 is disposed so that the center of the pin hole 501a may coincide with the center of the fixing hole 53a. The ground glass 503 works to illuminate the pin hole 501a uniformly.

Referring to FIG. 22, a diaphragm plate 511 including pin holes 511a, 511b, and a ground glass 513 are disposed on the fixing plate 54 in a same order as on the fixing plate 53. The centers of the pin holes 511a, 511b coincide with those of the fixing holes 54a and 54b.

Laser pens 505, 515 comprise laser diode 505a, 515a and collimator lens 505b, 515b respectively, and emit a parallel laser beam.

The laser beam emitted from the laser pen 505 passes through a ND filter 508, and is focused upon the pin hole 501a by a condenser lens 507 and the ground glass 503. The pin hole 501a is a point source. The laser beam emitted from the point source is converted into a parallel beam through the lens. A part of the parallel beam is reflected by the first half mirror surface 20a of the beam splitter 20, to a TV camera 530 after being transmitting through the second half mirror surface 20b.

The laser beam emitted from another laser pen 515 enters into the beam splitter 518 through a half wavelength plate 519 and a condenser lens 517, and is divided into two beams. The half wavelength plate 519 is disposed rotatably on the optical axis for adjusting the plane of polarization of the laser beam.

The laser beam incident on the beam splitter 518 is divided on the first half mirror surface 518a and the reflected beam is again reflected on the mirror surface 518b and condensed into the position at the second pin hole 511a.

The laser beam transmitting through the half mirror surface 518 is reflected by the mirror 518c, and condensed into the third pin hole 511b. The laser beams from the two pin holes are converted into parallel beams through the condenser lenses 27, 28 and then superposed by the auxiliary beam splitter 26, and a part of the superposed beam is reflected by the half mirror surface 20a. The laser beam reflected through the beam splitter 20 is reflected in the opposite direction by the corner cube 520, and again enters into the beam splitter 20. The component through the half mirror surface 20a, 20b proceeds toward the TV camera 530.

Thus, the beam splitter 20 emits three types of laser beams entering from different positions respectively toward the TV camera. These three laser beams are imaged on an image receiving surface 533 of the TV camera 530 by the objective lens 531 forming the image of the point surface. Accordingly, the output of the TV camera 530 displayed on the monitor 540 shows three indexes 541a, 542a, 542b, as in FIG. 23.

No error of the finish of the beam splitter 20 and the auxiliary beam splitter 26 can display the coincidence of the three point-images (541a, 541a, 641b) in the center of the monitor 540.

When the fixing position of the condenser lens 27 is in error to the auxiliary beam splitter 26, the amount S of the dislocation of the convergent points on the image receiving surface 533 is $$S = f2 \, D/f1$$

where f1 is a focal length of the condenser lens 27, f2 is a focal length of the objective lens 531, D is a displacement between the focal point of the condenser lens 27 and the of the pin hole 511a. center Therefore, the fixing errors of the condenser lenses 21, 27, 28 or the finish accuracy of the beam splitter 20 and auxiliary beam splitter 26 can be measured by the above formula, where S is obtained by measuring the lengths S1, S2, S3 form the center of the monitor divided by the magnification of the monitor.

The changing of the focal length f2 of the objective lens 531 increases of lessens the amount of the displacement S of the points (SI, S2, S3), and accordingly can change the sensitivity of detecting. The simultaneous observation of each spot in this embodiment can be changed for each spot respectively by emitting the laser beam from the laser pens 505, 515 selectively.

What is claimed is:

1. A wave front measuring apparatus comprising:
   a table on which a measuring object can be positioned, said table mounted for movement to incline the measuring object;
   a beam splitter for dividing a parallel incident beam from the measuring object into two beam fluxes;
   at least one image rotator installed in at least one optical path of the divided beam fluxes, said at least one image rotator adapted to rotate a wave front on the optical axis;
   means for interfering said beam fluxes whose wave fronts are rotated after superposing said beam fluxes;
   an image-formation lens adapted to form said interfered beam fluxes into an image; and
   means for observing image interference fringes.

2. A wave front aberration measuring apparatus according to claim 1, wherein said at least one image rotator is adapted to rotate to said wave front of said divided beam fluxes relatively in a 90° angle.

3. A wave front aberration measuring apparatus according to claim 1, wherein said at least one image rotator is disposed in an optical path of each of said divided beam fluxes.

4. A wave front aberration measuring apparatus according to claim 3, wherein said each of said at least one image rotator is of the same shape and material.

5. A wave front aberration measuring apparatus according to claim 1, wherein said at least one image rotator rotates said wavefront of said divided beam flux relatively in a 180° angle.

6. A wave front aberration measuring apparatus according to claim 1, wherein said at least one image rotator is adapted to optionally determine a rotating angle of said wave front of the divided beam flux.

7. A wave front aberration measuring apparatus according to claim 1, wherein said means for observing comprises an image sensor and a monitor.

8. A wave front aberration measuring apparatus according to claim 1, further comprising means for measuring an inclination of said table.

9. A wave font aberration measuring apparatus according to claim 8, wherein said means for measuring the inclination of said table comprises a mirror disposed on said table, a beam source for making parallel beams incident on said mirror, a condenser lens for condensing said beams reflected by said mirror, and an image sensor for receiving the condensed beam.

10. A wave front aberration measuring apparatus according to claim 1, further comprising:
 a condenser lens for condensing at least one of either of said divided beam fluxes, and
 an image sensor disposed at a condensing position of said flux.

11. A wave front aberration measuring apparatus comprising:
 a beam splitter for dividing a parallel beam flux incident from a measuring object into two fluxes;
 two mirrors for superposing each divided beam flux after said flux is again made incident to said beam splitter;
 an image rotator disposed in at least one optical path between said beam splitter and said each of said mirrors for rotating wave fronts of said two divided beam fluxes relatively in a 90° angle on an optical axis;
 an image-formation leans for forming said superposed fluxes into an image; and
 means for observing the image interference fringes.

12. A wave front aberration measuring apparatus comprising:
 an objective lens for converting a condensed beam incident from a measuring object into a parallel beam;
 a beam splitter for dividing said parallel beam into two beam fluxes;
 two mirrors for superposing each divided beam flux after said fluxes are made incident again to said beam splitter;
 an image rotator disposed in at least one optical path between said beam splitter and one of said mirrors for rotating the wave fronts of said two divided beam fluxes relatively in an 180° angle on an optical axis;
 an image-formation lens for forming the superposed beam fluxes into an image; and
 an observation means for observing the image interference fringes.

13. A wave front aberration measuring apparatus comprising:
 a beam splitter for dividing a parallel beam incident from a measuring object into two beam fluxes;
 two mirror for superposing the divided beam fluxes after said divided fluxes are again made incident on the beam splitter;
 an image rotator disposed in at least one optical path between said mirrors for rotating the wave fronts on a divided beam flux relatively in a 90° angle on an optical axis;
 a shutter for shutting either of said divided beam fluxes;
 a condenser lens for condensing either of at least one of the divided light beam fluxes;
 an image sensor disposed on a condensing position of the light beam fluxes;
 an image-formation lens for forming the superposed beam fluxes into an image; and
 an observation means for observing the image interference fringes.

14. The wave front aberration apparatus according to claim 11 further comprising a table on which a measuring object can e mounted for movement to incline the measuring object.

15. The wave front aberration apparatus according to claim 12 further comprising a table on which a measuring object can be mounted for movement to incline the measuring object.

16. The wave front aberration apparatus according to claim 13 further comprising a table on which a measuring object can be mounted for movement to incline the measuring object.

* * * * *

UNITED STATES PATENT AND TRADEMARK OFFICE
CERTIFICATE OF CORRECTION

PATENT NO. : 5,157,459
DATED : October 20, 11992
INVENTOR(S) : Masahiro OONO et al.

It is certified that error appears in the above-indentified patent and that said Letters Patent is hereby corrected as shown below:

At column 17, line 9 (claim 9, line 1), change "font" to ---front---.

At column 17, line 36 (claim 11, line 13), change "leans" to ---lens---.

At column 18, line 36 (claim 14, line 3), change "leans" to ---lens---.

Signed and Sealed this

Second Day of May, 1995

Attest:

BRUCE LEHMAN

*Attesting Officer*        *Commissioner of Patents and Trademarks*